(12) United States Patent
Oshima

(10) Patent No.: US 9,329,813 B2
(45) Date of Patent: May 3, 2016

(54) PROCESSING MANAGEMENT SYSTEM, ELECTRONIC APPARATUS, MANAGEMENT SERVER AND PROCESSING MANAGEMENT METHOD OF ELECTRONIC APPARATUS

(71) Applicant: SEIKO EPSON CORPORATION, Tokyo (JP)

(72) Inventor: Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/795,118

(22) Filed: Jul. 9, 2015

(65) Prior Publication Data

US 2016/0062713 A1 Mar. 3, 2016

(30) Foreign Application Priority Data

Aug. 29, 2014 (JP) ................................. 2014-175430

(51) Int. Cl.
*G06F 15/00* (2006.01)
*G06K 1/00* (2006.01)
*G06K 15/00* (2006.01)
*G06F 3/12* (2006.01)

(52) U.S. Cl.
CPC ............ *G06F 3/1222* (2013.01); *G06F 3/1238* (2013.01); *G06F 3/1288* (2013.01)

(58) Field of Classification Search
USPC ................................. 358/1.1–1.18
See application file for complete search history.

(56) References Cited

U.S. PATENT DOCUMENTS

| 2005/0265744 A1 | 12/2005 | Uruta | |
| 2013/0182288 A1* | 7/2013 | Nakamura | 358/1.15 |
| 2014/0078542 A1* | 3/2014 | Murayama | 358/1.14 |

FOREIGN PATENT DOCUMENTS

| JP | 2005-335215 A | 12/2005 |
| JP | 2014-048746 A | 3/2014 |

* cited by examiner

*Primary Examiner* — Douglas Tran
(74) *Attorney, Agent, or Firm* — Global IP Counselors, LLP

(57) ABSTRACT

Provided is a processing management method including: causing a management server to execute Step (S2-14) in which a server side account specified from user information is acquired and Step (S2-15) in which server side permission processing correlating to the server side account is read out; and causing a multi-function printer to execute Step (S2-16) in which the user information is transmitted to the management server, Step (S1-17) in which an apparatus side account is acquired, Step (S1-18) in which apparatus side permission processing correlating to the apparatus side account is read out, Step (S1-22) in which execution of processing, usage of which is permitted by both of the management server and the multi-function printer, is permitted, and a Step in which, when execution of the permitted processing is requested, the requested processing is executed.

12 Claims, 15 Drawing Sheets

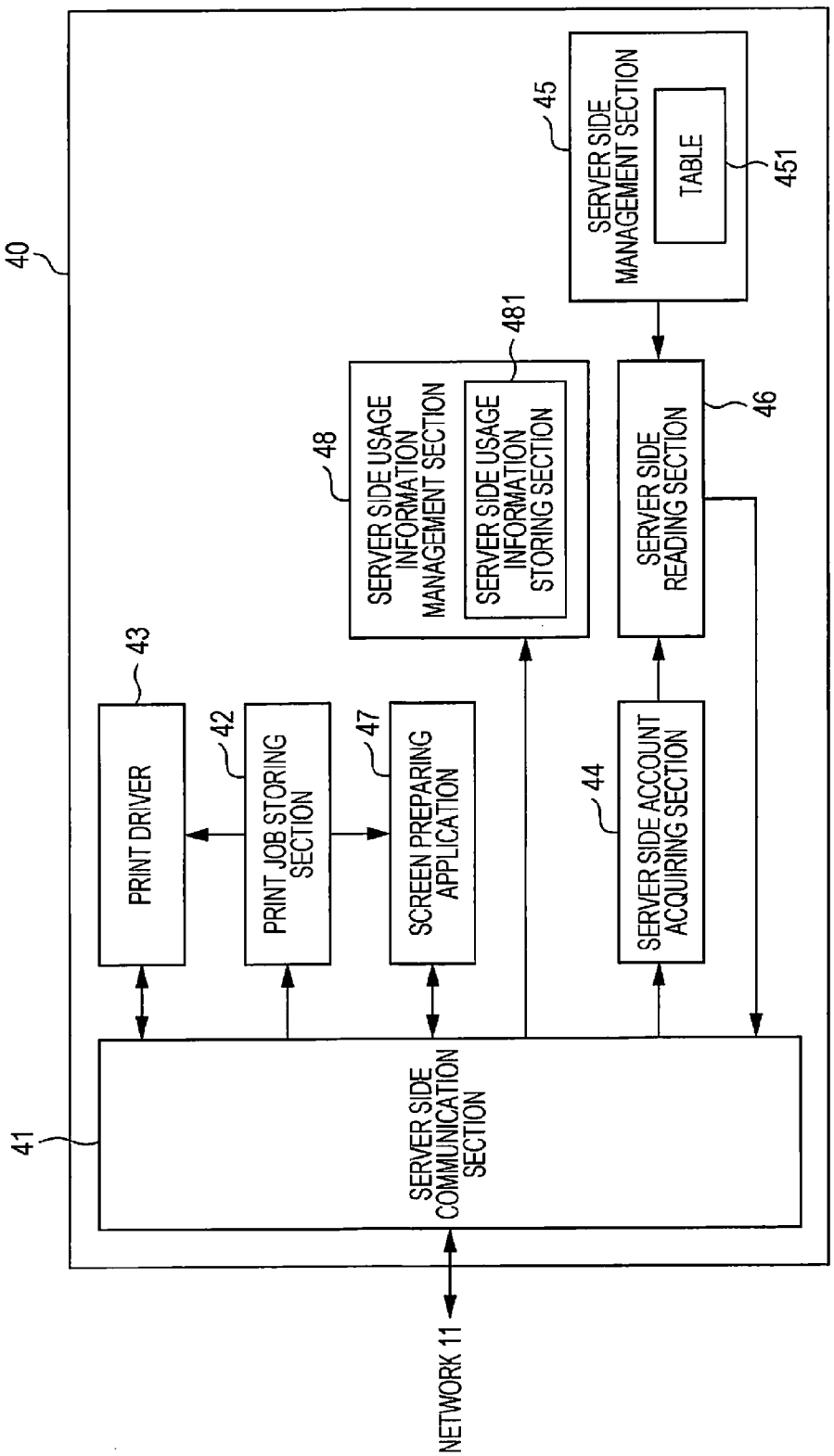

FIG. 4

| ACCOUNT | RECEPTION REQUIRED PROCESSING | | RECEPTION UNREQUIRED PROCESSING | | |
|---|---|---|---|---|---|
| | PC PRINTING | MEMORY PRINTING | COPYING | SCANNING | FAX |
| FIRST APPARATUS SIDE ACCOUNT X(1) | ○ | ○ | ○ | ○ | × |
| SECOND APPARATUS SIDE ACCOUNT X(2) | | | | | |
| ... | | | | | |
| NTH APPARATUS SIDE ACCOUNT X(N) | × | ○ | ○ | ○ | ○ |

{First (N-1) rows: COMMUNICATIVE APPARATUS SIDE ACCOUNT; Last row: UNCOMMUNICATIVE APPARATUS SIDE ACCOUNT}

FIG. 5

| ACCOUNT | PC PRINTING | MEMORY PRINTING | COPYING | SCANNING | FAX |
|---|---|---|---|---|---|
| FIRST SERVER SIDE ACCOUNT Y(1) | ○ | × | ○ | ○ | ○ |
| SECOND SERVER SIDE ACCOUNT Y(2) | ○ | ○ | ○ | × | × |
| ... | | | | | |
| MTH SERVER SIDE ACCOUNT Y(M) | × | × | ○ | ○ | ○ |

FIG. 17

| APPARATUS SIDE ACCOUNT | CORRELATED MANAGEMENT SERVER |
|---|---|
| FIRST APPARATUS SIDE ACCOUNT X(1) | FIRST MANAGEMENT SERVER |
| SECOND APPARATUS SIDE ACCOUNT X(2) | SECOND MANAGEMENT SERVER |
| THIRD APPARATUS SIDE ACCOUNT X(3) | THIRD MANAGEMENT SERVER |
| NTH APPARATUS SIDE ACCOUNT X(N) | — |

FIG. 18

| MANAGEMENT SERVER | MANAGED SERVER SIDE ACCOUNT |
|---|---|
| FIRST MANAGEMENT SERVER | FIRST SERVER SIDE ACCOUNT Y(1) TO 100TH SERVER SIDE ACCOUNT Y(100) |
| SECOND MANAGEMENT SERVER | 101ST SERVER SIDE ACCOUNT Y(101) TO 200TH SERVER SIDE ACCOUNT Y(200) |
| THIRD MANAGEMENT SERVER | 201ST SERVER SIDE ACCOUNT Y(201) TO 300TH SERVER SIDE ACCOUNT Y(300) |

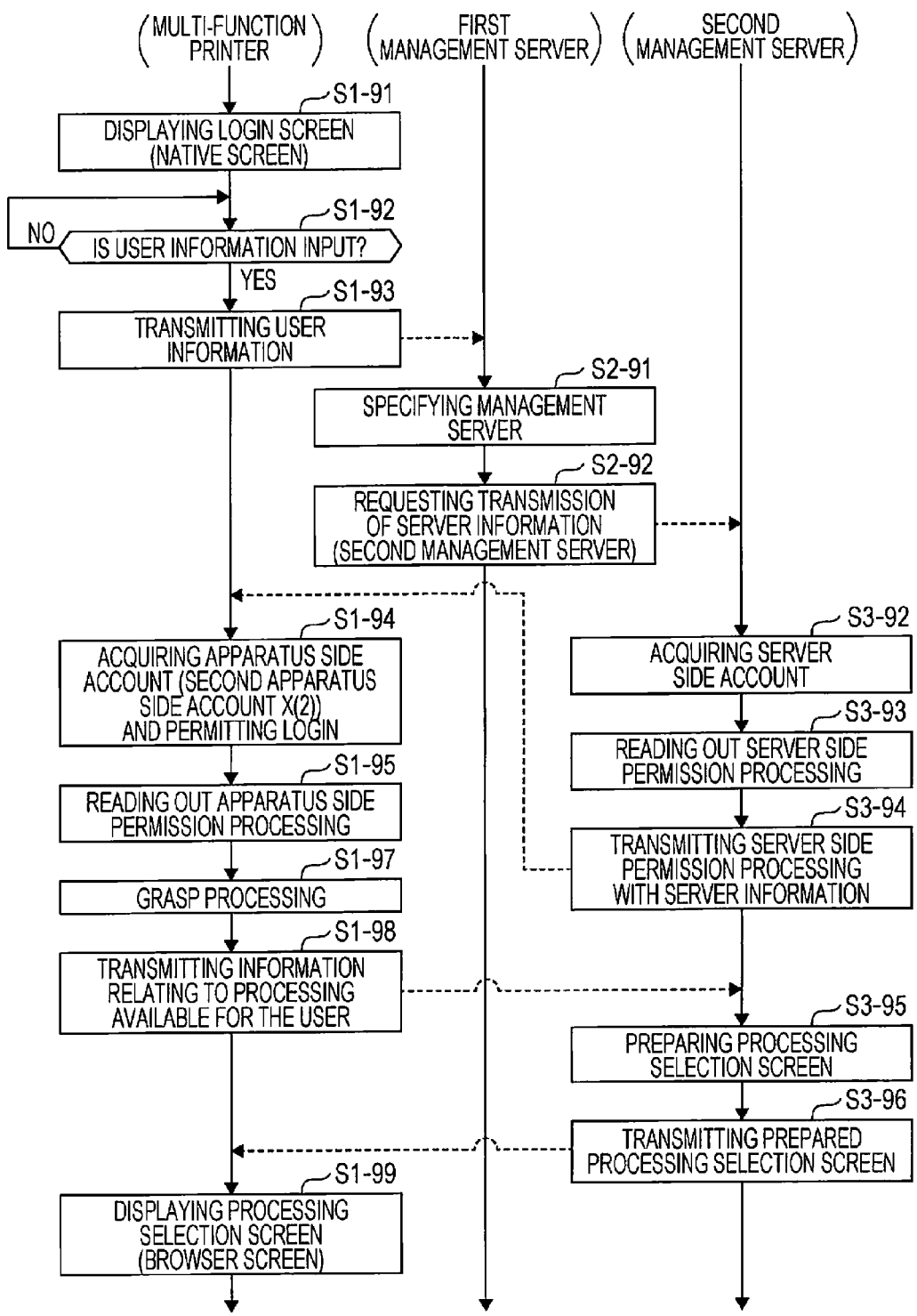

PROCESSING MANAGEMENT SYSTEM, ELECTRONIC APPARATUS, MANAGEMENT SERVER AND PROCESSING MANAGEMENT METHOD OF ELECTRONIC APPARATUS

BACKGROUND

1. Technical Field

The present invention relates to a processing management system that manages processing executed by an electronic apparatus, and an electronic apparatus constituting the processing management system, a management server constituting the processing management system, and a processing management method of the electronic apparatus.

2. Related Art

JP-A-2005-335215 describes an image processing apparatus (an example of the electronic apparatus) in which a login is required before various processing such as print processing is executed. The management tool for such an image processing apparatus causes accounts to correlate to permission processing corresponding to processing permitted to be used in the image processing apparatus in order for the correlated account and processing to be managed.

For example, the permission processing correlating to a first account is assumed to be only print processing and copy processing, and the permission processing correlating to a second account is assumed to be facsimile processing in addition to print processing and copy processing. In this condition, in a case where the first account is used to perform login to the image processing apparatus, print processing and copy processing are permitted to be executed but facsimile processing is prohibited from being executed in the image processing apparatus.

For this reason, in a case where as such, execution of the facsimile processing is requested by a user in the image processing apparatus to which a login is finished using the first account, the image processing apparatus automatically comes into a logoff state to prompt the user to perform another login using the second account. Further, when the second account is used to perform the login to the image processing apparatus, the image processing apparatus permits execution of the facsimile processing.

However, in the image processing apparatus described above, the accounts which can be managed are limited in number due to a memory capacity. For this reason, in a case where the number of users who are likely to use the image processing apparatus are large, due to a memory capacity limitation, it is difficult to set an account for each user and permit permission processing for each account.

SUMMARY

An advantage of some aspects of the invention is to provide a processing management system, an electronic apparatus, a management server, and a processing management method of the electronic apparatus, in which it is possible to individually set, for each user, processing permitted to be used, even in a case where there is a great number of users who use the electronic apparatus.

According to an aspect of the present invention, there is provided a processing management system including: an electronic apparatus; and a management server that communicates with the electronic apparatus through a network, wherein the management server includes a server side account acquiring section that, when user information corresponding to information relating to a user who logs in to the electronic apparatus is received from the electronic apparatus, acquires a server side account corresponding to an account specified from the user information; a server side management section that correlates the server side account with server side permission processing corresponding to processing permitted to be used in the electronic apparatus, and manages the server side account and the server side permission processing which correlate to each other; a server side reading section that reads out, from the server side management section, the server side permission processing correlating to the server side account acquired by the server side account acquiring section, and wherein the electronic apparatus includes an apparatus side communication section that, when the user information is input in order to log in to the electronic apparatus, transmits the user information to the management server; an apparatus side account acquiring section that, based on the input of the user information, acquires an apparatus side account corresponding to an account through which the electronic apparatus can be used; an apparatus side management section that correlates an apparatus side account with an apparatus side permission processing permitted to be used in the electronic apparatus, and manages the apparatus side account and the apparatus side permission processing which correlate to each other; an apparatus side reading section that reads out, from the apparatus side management section, the apparatus side permission processing correlating to the apparatus side account acquired by the apparatus side account acquiring section; an execution permission section that permits execution of the processing of which a usage is permitted by both of the management server and the electronic apparatus; and a control section that, when execution of the processing permitted by the execution permission section is requested, causes the processing to be executed.

According to the configuration described above, when the user information is input to the electronic apparatus, the user information is transmitted to the management server. If this occurs, the management server acquires the server side account which is specified from the user information received from the electronic apparatus, and causes the server side permission processing relating to the acquired server side account to be read out from the server side management section. Further, the electronic apparatus, which receives the user information, acquires the apparatus side account based on the input of the user information and performs a login using the acquired apparatus side account. If this occurs, the apparatus side permission processing correlating to the apparatus side account is read out from the apparatus side management section. Accordingly, based on the server side permission processing read out in the management server and the apparatus side permission processing read out in the electronic apparatus, the processing of which a usage is permitted by both of the electronic apparatus and the management server is determined. In other words, processing included in both of the server side permission processing and the apparatus side permission processing becomes the processing of which a usage is permitted by both of the electronic apparatus and the management server.

As a result, in the electronic apparatus, the processing of which a usage is permitted by both of the electronic apparatus and the management server is permitted to be executed. In other words, it is difficult for a user, who inputs user information to the electronic apparatus to, in the electronic apparatus, execute processing of which a usage is not permitted by at least one of the electronic apparatus and the management server. The processing permitted to be used in the electronic apparatus is managed not only by the apparatus side account which is managed in the electronic apparatus but also by the server side account which is managed in the management server. Accordingly, even in a case where there is a possibility that the number of users who use the electronic apparatus is greater than the number of apparatus side accounts capable of being managed by the electronic apparatus, it is possible to set, for each user, the processing of which a usage is permitted by the electronic apparatus. Therefore, even though the number of users are large, it is possible to individually set, for each user, the processing of which a usage is permitted.

In the processing management system according to above aspect, the management server may include a server side communication section that transmits, to the electronic apparatus, server information corresponding to information relating to the management server, when the user information is received from the electronic apparatus, and when the server information is received from the management server, the apparatus side account acquiring section of the electronic apparatus may acquire an account specified from the server information, the specified account being the apparatus side account.

According to the configuration described above, the electronic apparatus, which transmits the user information to the management server, receives the server information from the management server, and acquires the account specified from the received server information, as an apparatus side account. Further, when the apparatus side account is used to perform a login to the electronic apparatus, an apparatus side permission processing correlating to the apparatus side account is acquired from the apparatus side management section. As a result, based on the acquired apparatus side permission processing and the server side permission processing acquired by the management server, it is possible to determine processing of which a usage is permitted by both of the electronic apparatus and the management server. If this occurs, it is possible for the electronic apparatus to provide the processing of which a usage is permitted by both of the electronic apparatus and the management server, for a user who inputs user information to the electronic apparatus.

In the processing management system according to above aspect, when the control section causes the processing to be executed, the apparatus side communication section of the electronic apparatus may transmit, to the management server, usage information corresponding to information relating to the execution of the processing, and the management server may include a server side usage information storing section that stores the usage information received from the electronic apparatus.

According to the configuration described above, when the electronic apparatus is used to execute processing, and usage information relating the execution of the processing is transmitted to the management server from the electronic apparatus, the management server causes the received usage information to be stored in the server side usage information storing section. Accordingly, it is possible for the management server to grasp a usage state of the electronic apparatus for each server side account (that is, for each user).

In the processing management system according to above aspect, the apparatus side account which the electronic apparatus manages may include a communicative apparatus side account which causes the management server to have access to the electronic apparatus, and a uncommunicative apparatus side account which causes the access of the management server to the electronic apparatus to not be required, when the server information is received from the management server, the apparatus side account acquiring section of the electronic apparatus acquires an account specified from the received server information, the specified account being the communicative apparatus side account, whereas when the user information is input in order to log in to the electronic apparatus in a state where it is difficult for the electronic apparatus and the management server to communicate with each other, the apparatus side account acquiring section of the electronic apparatus acquires the uncommunicative apparatus side account, when the account acquired by the apparatus side account acquiring section is the communicative apparatus side account, the apparatus side reading section of the electronic apparatus reads out, from the apparatus side management section, the apparatus side permission processing correlating to the communicative apparatus side account, whereas when the account acquired by the apparatus side account acquiring section is the uncommunicative apparatus side account, the apparatus side reading section of the electronic apparatus reads out, from the apparatus side management section, the apparatus side permission processing correlating to the uncommunicative apparatus side account, and when the account acquired by the apparatus side account acquiring section is the communicative apparatus side account, the execution permission section of the electronic apparatus permits execution of the processing of which a usage is permitted by both of the management server and the electronic apparatus, whereas when the account acquired by the apparatus side account acquiring section is the uncommunicative apparatus side account, the execution permission section of the electronic apparatus permits execution of the processing of which a usage is permitted by the electronic apparatus.

According to the configuration described above, when the user information is input to the electronic apparatus in a state where it is possible for the electronic apparatus and the management server to communicate with each other, the user information is transmitted to the management server, and server information is transmitted to the electronic apparatus from the management server. If this occurs, in the electronic apparatus, an apparatus side account specified from the server information, that is, a communicative apparatus side account is acquired, and an apparatus side permission processing correlating to a communicative apparatus account is read out from the apparatus side management section. Further, the electronic apparatus permits execution of the processing of which a usage is permitted by both of the management server and the electronic apparatus.

Further, when there is a network failure or a breakdown of the management server, it is difficult for the electronic apparatus and the management server to communicate with each other. In this case, even though the user information is input to the electronic apparatus and the user information is transmitted to the management server from the electronic apparatus, the management server does not receive the user information, or even though the management server can receive the user information, it is likely to be difficult for the electronic apparatus to receive the server information. As a result, it is difficult for the electronic apparatus to acquire the communicative apparatus side account.

Further, according to the configuration described above, in a case where it is difficult for the electronic apparatus and the management server to communicate with each other, the electronic apparatus acquires a uncommunicative apparatus side account different from the communicative apparatus side account, and the apparatus side permission processing correlating to the uncommunicative apparatus side account is read out from the apparatus side management section. If this occurs, the electronic apparatus permits executing processing of which a usage is permitted by the electronic apparatus, that is, the apparatus side permission processing. Accordingly, not only the communicative apparatus side account but also the uncommunicative apparatus side account is prepared and thus it is possible for a user to use the electronic apparatus even in a case where it is difficult for the electronic apparatus and the management server to communicate with each other.

In the processing management system according to above aspect, the electronic apparatus includes an apparatus side usage information storing section which stores usage information corresponding to information relating to execution of processing when the control section causes the processing to be executed in a state where the account acquired by the apparatus side account acquiring section is the uncommunicative apparatus side account, and when it is possible for the electronic apparatus and the management server to communicate with each other, the apparatus side communication section of the electronic apparatus transmits, to the management server, the usage information stored in the apparatus side usage information storing section.

In a case where it is difficult for the electronic apparatus and the management server to communicate with each other in a state where the account acquired by the apparatus side account acquiring section is the uncommunicative apparatus side account, even though processing is executed in the electronic apparatus, it is difficult for the management server to receive the usage information relating to the processing from the electronic apparatus. Therefore, in the configuration described above, in a case where a user uses the electronic apparatus in a state where the account acquired by the apparatus side account acquiring section is the uncommunicative apparatus side account, the usage information prepared during the user's usage is stored in the apparatus side usage information storing section. The usage information stored in the apparatus side usage information storing section is transmitted to the management server when it is possible for the electronic apparatus and the management server to communicate with each other. Accordingly, it is possible for the management server to grasp a usage state of the electronic apparatus when it is difficult for the management server and the electronic apparatus to communicate with each other.

In the processing management system according to above aspect, when it is difficult for the electronic apparatus and the management server to communicate with each other in a state where the account acquired by the apparatus side account acquiring section is the communicative apparatus side account, the execution permission section of the electronic apparatus may come into a logoff state to be in a state of being capable of receiving a login to the electronic apparatus.

Further, there may be a case where it is difficult for the electronic apparatus and the management server to communicate with each other when the communicative apparatus side account is used to finish a login to the electronic apparatus as a result. In this case, according to the configuration described above, the electronic apparatus automatically performs a logoff to thereby be in a state where a login to the electronic apparatus is available. In this state, the user information is input to the electronic apparatus, the apparatus side account acquiring section acquires the uncommunicative apparatus side account, and thus the uncommunicative apparatus side account is used to perform a login to the electronic apparatus. As a result, even though it is difficult for the electronic apparatus and the management server to communicate with each other, it is possible for the user to use the electronic apparatus.

In the processing management system according to above aspect, the electronic apparatus may be a machine capable of executing reception required processing corresponding to processing based on information received from the management server, and reception unrequired processing corresponding processing in which reception information from the management server is not required, and processing relating to the uncommunicative apparatus side account is the reception unrequired processing, and processing relating to the communicative apparatus side account includes at least one of the reception required processing and the reception unrequired processing.

According to the configuration described above, in a case where the uncommunicative apparatus side account is used to perform a login to the electronic apparatus, there may be a possibility that it is difficult for the electronic apparatus and the management server to communicate with each other. Therefore, the reception required processing is not permitted to be executed, but the reception unrequired processing is permitted to be executed. Accordingly, in a case where there may be a possibility that it is difficult for the electronic apparatus and the management server to communicate with each other, it is possible to restrictively execute only the reception unrequired processing.

In the processing management system according to above aspect, the electronic apparatus may be capable of communicating with a plurality of the management servers through the network, a first apparatus side account correlating to a first management server among each management server, and a second apparatus side account correlating to a second management server among each management server are prepared to be the apparatus side account, when the apparatus side account specified from the server information is the first apparatus side account, the apparatus side reading section of the electronic apparatus reads out, from the apparatus side management section, the apparatus side permission processing correlating to the first apparatus side account, whereas when the apparatus side account specified from the server information is the second apparatus side account, the apparatus side reading section of the electronic apparatus reads out, from the apparatus side management section, the apparatus side permission processing correlating to the second apparatus side account, and when the apparatus side account specified from the server information is the first apparatus side account, the execution permission section of the electronic apparatus permits execution of the processing of which a usage is permitted by both of the first management server and the electronic apparatus, whereas when the apparatus side account specified from the server information is the second apparatus side account, the execution permission section of the electronic apparatus permits execution of the processing of which a usage is permitted by both of the second management server and the electronic apparatus.

There may be a case where it is possible for the electronic apparatus to communicate with a plurality of management servers. In this case, according to the configuration described above, when the electronic apparatus receives the server information from the first management server (or the second management server), the electronic apparatus acquires the first apparatus side account (or the second apparatus side account) specified from the received server information. Thereby, the acquired first apparatus side account (the second apparatus side account) is used to perform a login to the electronic apparatus and the apparatus side permission processing correlating to the first apparatus side account (the second apparatus side account) is read out. Further, the first management server (or the second management server) reads out the server side permission processing correlating to the server side account specified from the user information received from the electronic apparatus. As a result, the electronic apparatus permits executing the processing of which a usage is permitted by both of the first management server (or the second management server) and the electronic apparatus.

In the processing management system according to above aspect, the electronic apparatus may include a grasp section that compares the apparatus side permission processing read out by the apparatus side reading section with the server side permission processing read out by the server side reading section of the management server, and thereby grasps the processing of which a usage is permitted by both of the electronic apparatus and the management server, and the execution permission section of the electronic apparatus may permit execution of the processing of which the usage is permitted by both of the electronic apparatus and the management server, the grasp section grasping that the usage of the processing is permitted by both of the electronic apparatus and the management server.

According to the configuration described above, when the information relating to the server side permission processing correlating to the server side account is received by the electronic apparatus, in the electronic apparatus, the processing of which a usage is permitted by both of the electronic apparatus and the management server is grasped, and the electronic apparatus permits executing the processing of which a usage is permitted by both of the electronic apparatus and the management server.

In the processing management system according to above aspect, the management server further may include a grasp section that compares the server side permission processing read out by the server side reading section with the apparatus side permission processing read out by the apparatus side reading section of the electronic apparatus, and thereby grasps the processing of which a usage is permitted by both of the electronic apparatus and the management server; a server side communication section that transmits, to the electronic apparatus, grasped permission information corresponding to information relating to a result of grasping performed by the grasp section; and when the grasped permission information is received from the management server, the execution permission section of the electronic apparatus permits execution of the processing of which the usage is permitted by both of the electronic apparatus and the management server, the grasp section grasping that the usage of the processing is permitted by both of the electronic apparatus and the management server.

According to the configuration described above, when the information relating to the apparatus side permission processing correlating to the apparatus side account is received, in the management server, the processing of which a usage is permitted by both of the electronic apparatus and the management server is grasped, and grasped permission information corresponding to information relating to a result of grasping is transmitted to the electronic apparatus. Further, the electronic apparatus, which receives the grasped permission information, permits execution of the processing of which a usage is permitted by both of the electronic apparatus and the management server.

According to another aspect of the invention, there is provided an electronic apparatus that communicates with a management server through a network, the electronic apparatus including: an apparatus side communication section that, when user information corresponding to information relating to a user who logs in to the electronic apparatus is input, transmits the user information to the management server; an apparatus side account acquiring section that, based on the input of the user information, acquires an apparatus side account corresponding to an account through which the electronic apparatus can be used; an apparatus side management section that correlates an apparatus side account with an apparatus side permission processing permitted to be used in the electronic apparatus, and manages the apparatus side account and the apparatus side permission processing which correlate to each other; an apparatus side reading section that reads out, from the apparatus side management section, the apparatus side permission processing correlating to the apparatus side account acquired by the apparatus side account acquiring section; an execution permission section that, when information relating to server side permission processing corresponding to processing of which a usage is permitted by the electronic apparatus is received from the management server that transmits the user information, permits execution of the processing of which a usage is permitted by both of the management server and the electronic apparatus; and a control section that, when execution of the processing permitted by the execution permission section is requested, causes the processing to be executed.

According to the configuration described above, when the user information is input, in the apparatus, the user information is transmitted to the management server. If this occurs, the management sever, which receives the user information, transmits, to the electronic apparatus, the information relating to the server side permission processing correlating to the account specified from the user information.

Further, the electronic apparatus acquires the apparatus side account based on the input of the user information, and the acquired apparatus side account is used to perform a login to the multi-function printer. Thereby, the apparatus side permission processing correlating to the acquired apparatus side account is read out from the apparatus side management section. Further, in the electronic apparatus, when the information relating to the server side permission processing is received from the management server, based on the server side permission processing and the read-out apparatus side permission processing, the processing of which a usage is permitted by both of the electronic apparatus and the management server is determined, and thus execution of the processing is permitted. Accordingly, the electronic apparatus is used to be as an apparatus constituting the processing management system, and thus even in a case where the number of the users are large, it is possible to individually set, for each user, the processing of which a usage is permitted.

According to still another aspect of the invention, there is provided a management server that communicates with an electronic apparatus through a network, when user information corresponding to information relating to a user who logs in to the electronic apparatus is input, the electronic apparatus acquires an apparatus side account based on the input of the user information, and transmits, to the management server, information relating to apparatus side permission processing corresponding to processing correlating to the acquired apparatus side account, and the management server includes: a server side account acquiring section that, when the user information is received from the electronic apparatus, acquires a server side account corresponding to an account specified from the user information; a server side management section that correlates the server side account with server side permission processing permitted to be used in the electronic apparatus, and manages the server side account and the server side permission processing which correlate to each other; a server side reading section that reads out, from the server side management section, the server side permission processing correlating to the server side account acquired by the server side account acquiring section; a grasp section that, based on the server side permission processing read out by the server side reading section and information relating to the apparatus side permission processing received from the electronic apparatus, grasps the processing of which a usage is permitted by both of the electronic apparatus and the management server; and a server side communication section that transmits, to the electronic apparatus, grasped permission information corresponding to information relating to a result of grasping performed by the grasp section.

According to the configuration described above, when user information is input, in the electronic apparatus, the user information is transmitted to the management server. Further, the electronic apparatus acquires the apparatus side account based on the input of the user information, the apparatus side permission processing correlating to the acquired apparatus side account is read out, and the information relating to the apparatus side permission is transmitted to the management server.

Further, when the user information is received from the electronic apparatus, the management server acquires the server side account specified from the user information, and the server side permission processing correlating to the server side account is read out from the server side management section. Further, when the information relating to the apparatus side permission processing is received from the electronic apparatus, based on the apparatus side permission processing and the read-out server side permission processing, the management server grasps the processing of which a usage is permitted by both of the electronic apparatus and the management server, and transmits, to the electronic apparatus, information relating to a result of the grasping.

As a result, it is possible for the electronic apparatus, which receives the information, to permit execution of the processing of which a usage is permitted by both of the management server and the electronic apparatus. Accordingly, the management server is used to be as an apparatus constituting the processing management system, and thus even in a case where the number of the users are large, it is possible to individually set, for each user, the processing of which a usage is permitted.

According to still another aspect of the invention, there is provided a processing management method of an electronic apparatus applied to a processing management system including the electronic apparatus and a management server that communicates with the electronic apparatus through a network, the method including: managing a server side account corresponding to an account managed in the management server and server side permission processing corresponding to processing permitted to be used in the electronic apparatus such that the server side account and the server side permission processing are caused to correlate to each other in the management server; and managing an apparatus side account corresponding to an account managed in the electronic apparatus and apparatus side permission processing corresponding to processing permitted to be used in the electronic apparatus such that the apparatus side account and the apparatus side permission processing are caused to correlate to each other in the electronic apparatus; causing the management server to execute acquiring the server side account specified from user information when the user information relating to a user who logs in to the electronic apparatus is received from the electronic apparatus, reading the server side permission processing correlating to the server side account acquired in the acquiring of the server side account; and causing the electronic apparatus to execute transmitting the user information to the management server when the user information is input in order to log in to the electronic apparatus, acquiring the apparatus side account based on the input of the user information, reading the apparatus side permission processing correlating to the apparatus side account acquired in the acquiring of the apparatus side account, permitting execution of processing a usage of which is permitted by both of the management server and the electronic apparatus, and controlling the processing to be executed when execution of the processing permitted in the permitting is requested.

According to the configuration described above, it is possible to attain the same effect as that of the processing management system described above.

BRIEF DESCRIPTION OF THE DRAWINGS

The invention will be described with reference to the accompanying drawings, wherein like numbers reference like elements.

FIG. 3 is a block diagram showing a functional configuration of a management server.

FIG. 4 is a table in which apparatus side accounts and processing permitted to be used in a multi-function printer correlate to each other for management.

FIG. 5 is a table in which sever side accounts and processing permitted to be used in a multi-function printer correlate to each other for management.

FIG. 17 is a table showing a relationship between apparatus side accounts and management servers correlating to the apparatus side account.

FIG. 18 is a table showing a relationship between management servers and server side accounts to be managed.

FIG. 19 is a flow chart explaining processing procedures when a user logs in to a multi-function printer in a state where it is possible for a multi-function printer and a management server to communicate with each other.

DESCRIPTION OF EXEMPLARY EMBODIMENTS

First Embodiment

Hereinafter, a description will be made of a first embodiment in which a processing management system, an electronic apparatus, a management server and a processing management method of an electronic apparatus are concretely implemented, with reference to FIG. 1 to FIG. 15.

Figure 1:
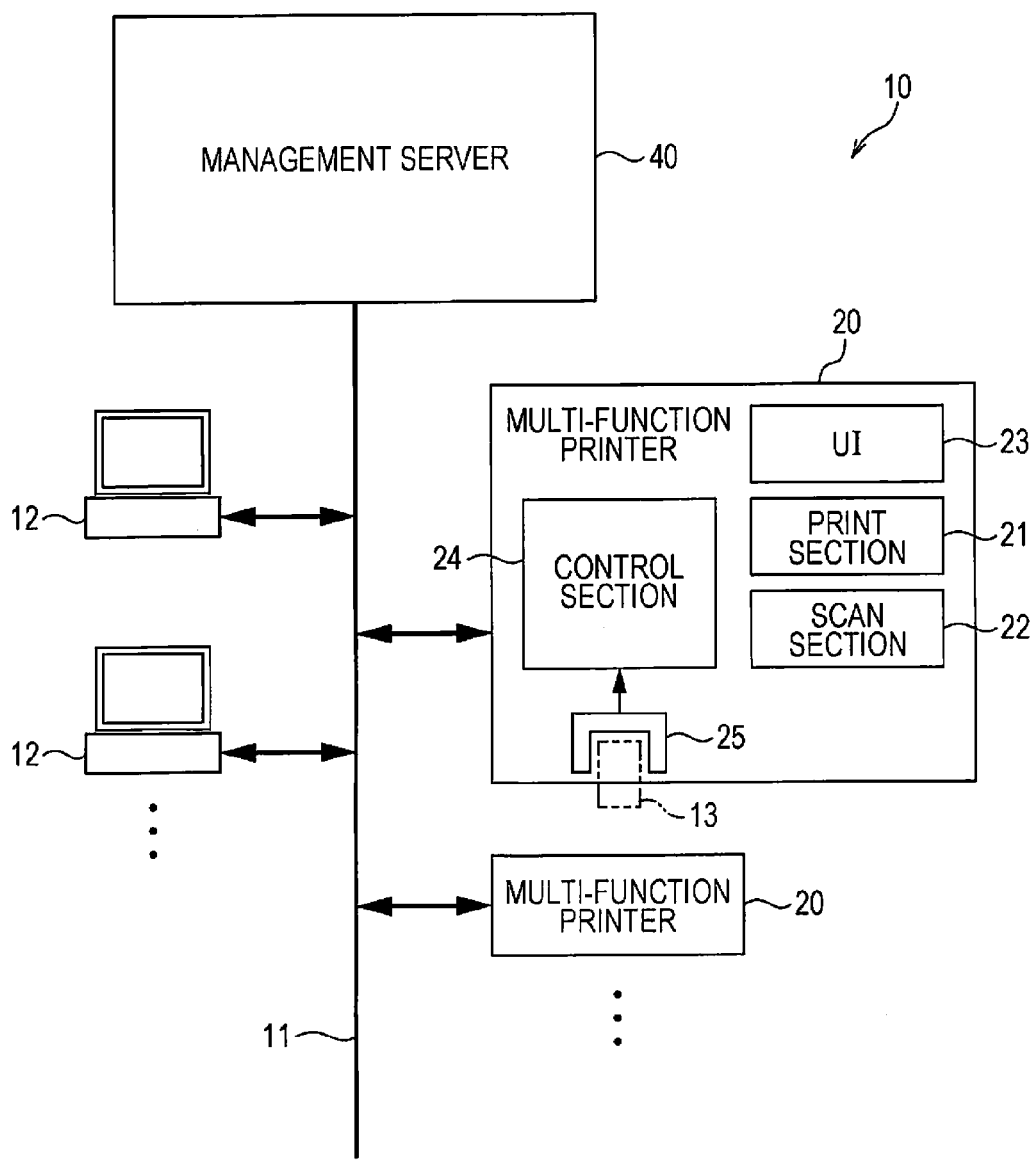
FIG. 1 is a schematic configuration diagram showing a processing management system of a first embodiment.

As shown in FIG. 1, a processing management system 10 of the embodiment includes a management server 40, and a plurality of multi-function printers 20 which is communicable with a management server 40 through a network 11 such as a local area network (LAN). These multi-function printers 20 are an example of "an electronic apparatus".

The multi-function printer 20 includes a print section 21 of an ink jet type that performs printing on print media such as a paper, a scan section 22 that reads out images stored in record media, a user interface 23 and a control device 24. Further, the multi-function printer 20 includes a card inserting section 25 in which a memory card 13 capable of storing image data and the like is able to be inserted. The control device 24 includes a micro-computer which is configured to include a CPU, a RAM, a non-volatile memory and the like, and an application specific IC (ASIC). Further, as long as it is possible to print on the media, the print type of the print section 21 may be any other types such as a dot impact type, a laser type, a thermosensitive type and the like other than the ink jet type.

Processing which is capable of being executed in the multi-function printer 20 includes printing, copying, scanning and facsimile (hereinafter referred to as "FAX"). Further, printing capable of being executed in the multi-function printer 20 may include memory printing which is based on image data stored in the memory card 13, PC printing which is based on a print job received through a network 11, and the like.

In other words, a processing management system 10 is connected to information terminals 12 used by users through the network 11. Further, for example, if a user operates the information terminal 12 to request printing, a print job is transmitted from the information terminal 12 to the management server 40. Further, if the print job is transmitted from the management server 40 to one multi-function printer among the plurality of multi-function printers 20, the related multi-function printer performs the printing based the print job.

Further, when scanning is executed in the multi-function printer 20, image data relating to an image read out from media is transmitted to the information terminal 12 through the network 11. Further, when FAX is executed in the multi-function printer 20, the image data relating to an image read out from media becomes FAX data to be transmitted to the outside of the system.

Hereinafter, with reference to FIG. 2, the user interface 23 of the multi-function printer 20 will be described.

Figure 2:
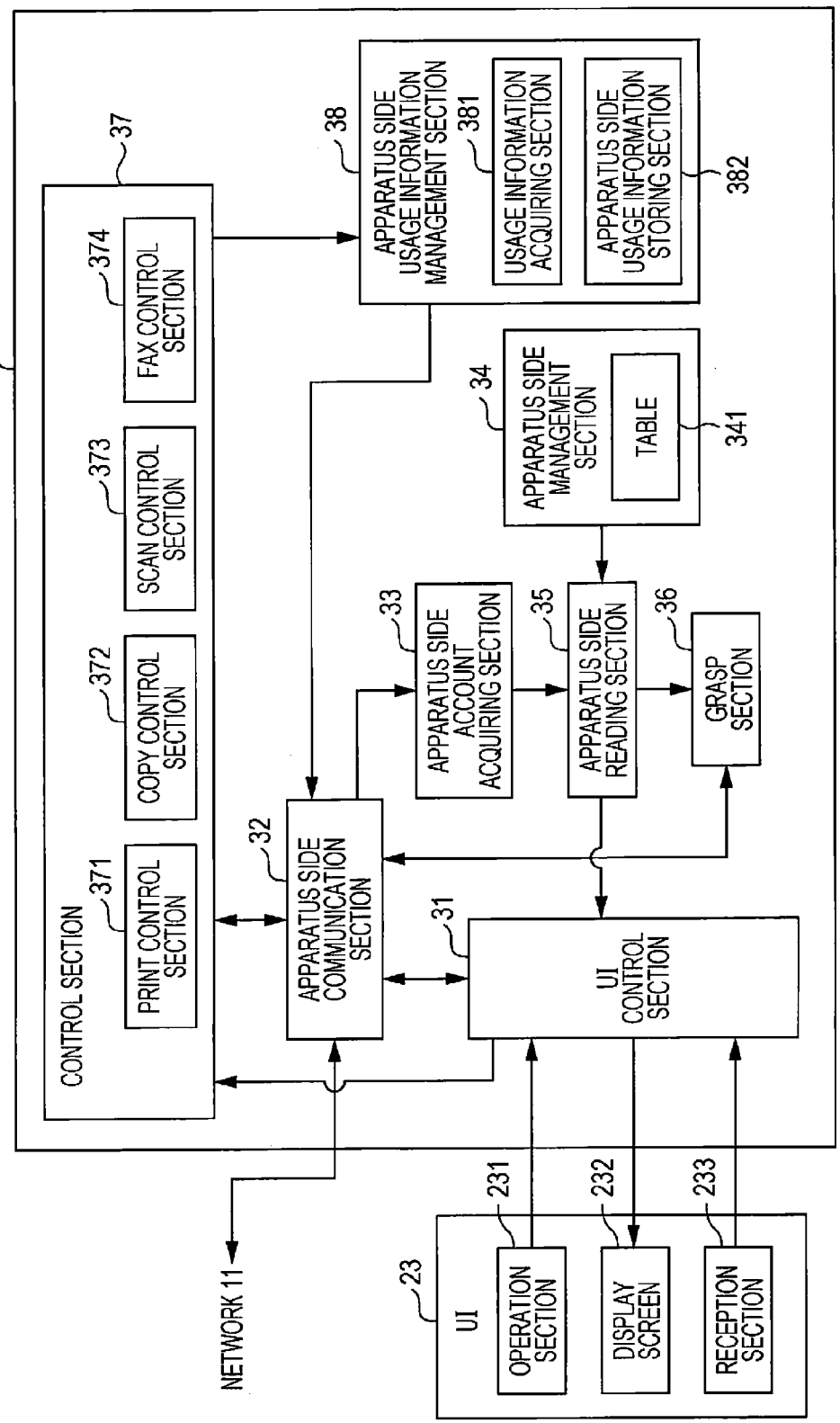
FIG. 2 is a block diagram showing a functional configuration of a control device in a multi-function printer.

As show in FIG. 2, the user interface 23 includes an operating section 231 in which input operating is performed by a user, a display screen 232 that guides various information, and a reception section 233 that reads out user information registered in an authentication card. The operating section 231 includes at least one of a touch panel and a push button type hard key which are attached to the display screen 232. Further, the user information corresponds to the information (for example, a user ID and the like) that specifies a user who has an authentication card. Further, the input information generated due to operating of the operating section 231 performed by a user, and the user information read out by the reception section 233 are input to the control device 24 of the multi-function printer 20 through the user interface 23.

Further, in the processing management system 10 of the embodiment, the reception section 233 of the multi-function printer 20 is caused to read out the user information registered in the authentication card so that a login is performed with respect to the multi-function printer 20, and thus the user can use the multi-function printer 20. Further, for each piece of user information that is read out, that is, for each user, processing (printing, copying, scanning and FAX as described above) of which usages are permitted by the multi-function printer 20 is set. Further, even in a state where the user information is read out and a login is performed with respect to the multi-function printer 20, when a predetermined time passes or when it is detected that it is difficult for the multi-function printer 20 and the management server 40 to communicate with each other, the multi-function printer 20 automatically comes into a logoff state.

Hereinafter, with reference to FIG. 2 and FIG. 4, a functional configuration of the control device 24 of the multi-function printer 20 will be described.

As shown in FIG. 2, the control device 24 of the multi-function printer 20 is a functional section configured to include at least one of software and hardware, and includes a UI control section 31, an apparatus side communication section 32, an apparatus side account acquiring section 33, an apparatus side management section 34, an apparatus side reading section 35, a grasp section 36, a control section 37 and apparatus side usage information management section 38. Further, the "UI" described above is an abbreviated name of "User Interface".

The UI control section 31 performs display controlling of the display screen 232 of the user interface 23 and receives information input from the user interface 23, that is, the above input information or the above user information. In other words, when user information is input from the reception section 233, the UI control section 31 outputs the user information to the apparatus side communication section 32. Further, the UI control section 31 determines whether an output destination of the input information received from the operating section 231 is the apparatus side communication section 32 or the control section 37. Further, the UI control section 31 outputs the input information to the determined output destination.

Further, when information relating to a browser screen corresponding to a screen prepared in the management server 40 is received from the apparatus side communication section 32, the UI control section 31 causes the browser screen to be displayed on the display screen 232. Further, the UI control section 31 may cause a native screen (which is not the browser screen) to be displayed, but herein the native screen corresponds to a screen made or prepared in the control device 24 of the multi-function printer 20.

The apparatus side communication section 32 has a role in communication with the management server 40 through the network 11. In other words, when user information is received from the UI control section 31, the apparatus side communication section 32 transmits the received user information to the management server 40. Further, the apparatus side communication section 32 receives server information from the management server 40 which transmits the user information. The received server information has information that specifies the management server 40. Further, the apparatus side communication section 32 outputs the received server information to the apparatus side account acquiring section 33. Further, when being capable of transmitting the user information and being not capable of receiving the server information, the apparatus side communication section 32 determines that it is difficult to communicate with the management server 40, and outputs the intent of the communication unavailability to the apparatus side account acquiring section 33.

Further, when the input information is received from the UI control section 31, the apparatus side communication section 32 requests information (for example, print job) to the management server 40, and receives the information based on the request. Further, the apparatus side communication section 32 appropriately outputs the received information to the UI control section 31, the grasp section 36 or the control section 37.

When user information is received from the reception section 233, based on the received user information, the apparatus side account acquiring section 33 acquires an apparatus side account through which the multi-function printer 20 can be used. Further, the apparatus side account acquiring section 33 outputs the acquired apparatus side account to the apparatus side reading section 35. Further, in the multi-function printer 20, it is possible to set the number of apparatus side accounts to N (N is an integer of 1 or more, for example, 10)

In other words, when the server information transmitted from the management server 40 is input from the apparatus side communication section 32, the apparatus side account acquiring section 33 acquires an apparatus side account specified from the input server information, and outputs the apparatus side account to the apparatus side reading section 35. In the processing management system 10 of the embodiment, the server that is capable of communicating with the multi-function printer 20 is only the management server 40. When the server information is input from the management server 40, the apparatus side account acquiring section 33 acquires a first apparatus side account X(1) as an apparatus side account correlating to the management server 40. In other words, the first apparatus side account X(1) is an example of "a communicative apparatus side account" which causes the management server 40 to have access to the multi-function printer 20.

Further, as described above, there may be a case where it is difficult to receive server information due to failure of the network 11 and the like. In this case, taking the opportunity of the input of the user information from the reception section 233, the apparatus side account acquiring section 33 acquires a N-TH apparatus side account X(N). In other words, the N-TH apparatus side account X(N) is an example of "a uncommunicative apparatus side account" which causes the management server 40 to not be required to have access to the multi-function printer 20.

The apparatus side management section 34 includes a table 341 in which apparatus side accounts and apparatus side permission processing that is the processing permitted to be used in a multi-function printer 20 are caused to correlate to each other for management. FIG. 4 shows an example of the table 341.

In other words, as shown in FIG. 4, in the table 341, apparatus side permission processing that is the processing permitted to be used in a multi-function printer 20, and apparatus side prohibition processing that is the processing prohibited to be used in a multi-function printer 20 are provided for each apparatus side account. For example, in the first apparatus side account X(1) which is an example of the communicative apparatus side account, PC printing, memory printing, copying and scanning are set to be the apparatus side permission processing, and FAX is set to be apparatus side prohibition processing. Further, in an N-TH apparatus side account X(N) which is an example of the uncommunicative apparatus side account, the memory printing, the copying, the scanning and the FAX are set to be the apparatus side permission processing, and the PC printing is set to be the apparatus side prohibition processing.

Further, as described above, the PC printing is based on a print job received from the management server 40. Therefore, the management server 40 is an example of "reception required processing" based on received information. On the other hand, the processing other than the PC printing, that is, the memory printing, the copying, the scanning and the FAX are examples of "reception unrequired processing" in which it is not required for information to be received from the management server 40. In other words, the apparatus side permission processing correlating to the first apparatus side account X(1) includes both of the reception required processing and the reception unrequired processing, and the apparatus side permission processing correlating to the N-TH apparatus side account X(N) includes the reception unrequired processing, but does not include the reception required processing.

As shown in FIG. 2, when an apparatus side account is input from the apparatus side account acquiring section 33, the apparatus side reading section 35 reads out the apparatus side permission processing correlating to the input apparatus side account from the table 341 of the apparatus side management section 34. For example, in a case where the input account, is the first apparatus side account X(1), the apparatus side reading section 35 reads out the PC printing, the memory printing, the copying and the scanning as the apparatus side permission processing (see FIG. 4), and outputs the read-out apparatus side permission processing to the grasp section 36.

On the other hand, in a case where the input account is the N-TH apparatus side account X(N), the apparatus side reading section 35 reads out the memory printing, the copying, the scanning and the FAX, which correspond to the apparatus side permission processing (see FIG. 4). Further, the apparatus side reading section 35 prepares a screen (see FIG. 10) that displays the read-out apparatus side permission processing in the form of a lookup list, and outputs, to the UI control section 31, the screen information corresponding to information relating to the prepared screen. If this occurs, the UI control section 31 displays a screen (see FIG. 10) that displays processing available at current time in the form of a lookup list on the display screen 232.

The grasp section 36 grasps the processing of which a usage is permitted by both of the multi-function printer 20 and the management server 40. In other words, the apparatus side permission processing correlating to the first apparatus side account X(1) is input to the grasp section 36. Further, information relating to the server side permission processing of which a usage is permitted to the user by the management server 40 is input to the grasp section 36 through the apparatus side communication section 32, which will be described later in more detail. The grasp section 36 compares the input apparatus side permission processing with the input server side permission processing to thereby grasp the processing of which a usage is permitted by both of the multi-function printer 20 and the management server 40. For example, the server side permission processing is assumed to be the PC printing, the copying, the scanning and the FAX. In this case, since the apparatus side permission processing correlating to the first apparatus side account X(1) is the PC printing, the memory printing, the copying, the scanning, the processing of which a usage is permitted by both of the multi-function printer 20 and the management server 40 is the PC printing, the copying and the scanning. The FAX is not included in the apparatus side permission processing correlating to the first apparatus side account X(1), and thus the FAX is prohibited from being used.

Further, the grasp section 36 outputs, to the apparatus side communication section 32, the grasped permission information corresponding to information relating to processing of which a usage is permitted by both of the multi-function printer 20 and the management server 40. If this occurs, the apparatus side communication section 32 transmits the grasped permission information to the management server 40. Further, as described above, when the grasped permission information is transmitted to the management server 40, the management server 40 prepares a screen (see FIG. 7) in the form of a browser screen, while in the form of a lookup list, the prepared screen displays the processing of which a usage is permitted by both of the multi-function printer 20 and the management server 40. Further, screen information relating to the prepared screen is transmitted to the apparatus side communication section 32. If this occurs, the transmitted screen information is transmitted to the UI control section 31, the UI control section 31 causes the screen shown in FIG. 7 to be displayed on the display screen 232. In other words, the UI control section 31 is used to configure an example of "an execution permission section", and the execution permission section permits execution of the processing of which a usage is permitted by both of the multi-function printer 20 and the management server 40.

The control section 37 includes a print control section 371, a copy control section 372, a scan control section 373 and a FAX control section 374. When the PC printing or the memory printing is requested, the print control section 371 controls the print section 21 to executes the requested processing. For example, in a case where the PC printing is executed, when a print job is received through the apparatus side communication section 32, the print control section 371 performs printing based on the received print job. Further, in a case where the memory printing is executed, the print control section 371 reads out image data from the memory card 13 inserted into the card inserting section 25, and performs printing based on the read-out image data.

When the copying is requested, the copy control section 372 controls the print section 21 and the scan section 22 to execute the requested copying.

When the scanning is requested, the scan control section 373 controls the scan section 22 to execute the requested scanning, and outputs the acquired image data to the apparatus side communication section 32. If this occurs, the apparatus side communication section 32 transmits the image data to the information terminal 12. A user is capable of operating the operating section 231 to select the information terminal 12 which is a transmission destination.

When the FAX is requested, the FAX control section 374 controls the scan section 22 to read out and acquire an image recorded in media, and outputs the acquired image data to the apparatus side communication section 32 in the form of FAX data. If this occurs, the apparatus side communication section 32 transmits the FAX data to a transmission destination.

The apparatus side usage information management section 38 includes a usage information acquiring section 381 and an apparatus side usage information storing section 382. When the control section 37 performs processing (for example, the PC printing), the usage information acquiring section 381 acquires a usage information corresponding to information relating to the execution of the processing. The usage information includes the number of the printed (or copied) media, information specifying a user who uses the multi-function printer 20, and the like. Further, when the account acquired by the apparatus side account acquiring section 33 is a communicative apparatus side account (in this case, the first apparatus side account X(1)), that is, when the communicative apparatus side account is used to log in to the multi-function printer 20, the usage information acquiring section 381 outputs the acquired usage information to the apparatus side communication section 32. If this occurs, the apparatus side communication section 32 transmits the usage information to the management server 40.

On the other hand, when the account acquired by the apparatus side account acquiring section 33 is a uncommunicative apparatus side account (in this case, a N-TH apparatus side account X(N)), that is, when the uncommunicative apparatus side account is used to log in to the multi-function printer 20, the usage information acquiring section 381 causes the acquired usage information to be stored in the apparatus side usage information storing section 382. Further, when it is possible for the multi-function printer 20 and the management server 40 to communicate with each other, the usage information acquiring section 381 outputs, to the apparatus side communication section 32, the usage information stored in the apparatus side usage information storing section 382. If this occurs, the apparatus side communication section 32 transmits the usage information to the management server 40. Further, as described above, when the usage information is transmitted to the management server 40 from the apparatus side usage information storing section 382, the usage information of which the transmission is finished is deleted in the apparatus side usage information storing section 382.

Hereinafter, with reference to FIG. 3 and FIG. 5, the management server 40 will be described.

As shown in FIG. 3, the management server 40 corresponds to a functional section configured to include at least one of software and hardware, and includes a server side communication section 41, a print job storing section 42, a print driver 43, a server side account acquiring section 44, a server side management section 45, a server side reading section 46, a screen preparing application 47 and a server side usage information management section 48.

The server side communication section 41 takes a role in communication between the multi-function printer 20 and the information terminal 12 through the network 11. In other words, when a print job is received from the information terminal 12, the server side communication section 41 outputs the received print job to the print job storing section 42. Further, when the print job is input from the print driver 43, the server side communication section 41 transmits the print job to the multi-function printer 20 which requests the print job.

Further, when user information is received from the multi-function printer 20, the server side communication section 41 outputs the received user information to the server side account acquiring section 44.

Further, when screen information is input from the screen preparing application 47, the server side communication section 41 transmits the input screen information to the multi-function printer 20.

Further, when usage information is received from the multi-function printer 20, the server side communication section 41 outputs the received usage information to the server side usage information management section 48.

The print job storing section 42 stores the print job input from the server side communication section 41 in a state where the input print job is caused to correlate to the information terminal 12, that is, a user (a server side account to be described later in more detail). Further, when a request for the PC printing from the multi-function printer 20 is received through the server side communication section 41, the print job storing section 42 prepares a lookup list of print jobs correlating to a user who logs in to the related multi-function printer 20, and outputs, to the screen preparing application 47, job lookup list information which is the information relating to the lookup list of print jobs.

When information specifying a print job which is a target to be printed is received from the multi-function printer 20 through the server side communication section 41, the print driver 43 reads out the requested print job from the print job storing section 42, and converts the read-out print job to data which is available for the multi-function printer 20. Further, the print driver 43 outputs the converted print job to the server side communication section 41. If this occurs, the server side communication section 41 transmits the converted print job to the multi-function printer 20.

When user information is input from the server side communication section 41, the server side account acquiring section 44 acquires a server side account which is an account specified from the input user information. Further, server side accounts correlating individually to all of users using this system are set in the management server 40. In other words, the server side account is an account that specifies a user who uses the multi-function printer 20. Further, the server side account acquiring section 44 outputs the acquired server side account to the server side reading section 46.

The server side management section 45 includes a table 451 in which server side accounts and server side permission processing that is the processing permitted to be used in a multi-function printer 20 are caused to correlate to each other for management. FIG. 5 shows an example of the table 451.

In other words, as shown in FIG. 5, in the table 451, server side permission processing as the processing permitted to be used in a multi-function printer 20, and server side prohibition processing as the processing prohibited to be used in a multi-function printer 20 are provided for each server side account. For example, in a first server side account Y(1) which correlates to a first user, the PC printing, the copying, the scanning and the FAX are set to be the server side permission processing, while the memory printing is set to be server side prohibition processing. Further, in a second server side account Y(2) which correlates to a second user, the PC printing, the memory printing and the copying are set to be the server side permission processing, while the scanning and the FAX are set to be the server side prohibition processing. Further, in a M-TH server side account Y(M) which correlates to an M-TH user, the copying, the scanning and the FAX are set to be the server side permission processing, while the PC printing and the memory printing are set to be the server side prohibition processing. Further, the "M" described herein is an integer of 2 or more, and has a value greater than that of the N.

As shown in FIG. 3, when a server side account is input from the server side account acquiring section 44, the server side reading section 46 reads out server side permission processing correlating to the input server side account from the table 451 of the server side management section 45. For example, in a case where the input account is the first server side account Y(1), the server side reading section 46 reads out the PC printing, the copying, the scanning and the FAX which are the server side permission processing, and outputs, to the server side communication section 41, information relating to the read-out server side permission processing. If this occurs, the server side communication section 41 transmits, to the multi-function printer 20, the information relating to the server side permission processing, and also server information corresponding to information relating to the management server.

When grasped permission information is received through the server side communication section 41, the screen preparing application 47 prepares a screen that displays, in the form of a lookup list (see FIG. 7), the processing of which a usage is permitted by both of the multi-function printer 20 and the management server 40, and the screen preparing application 47 outputs the screen information relating to the prepared screen to the server side communication section 41. If this occurs, the server side communication section 41 transmits the screen information to the multi-function printer 20.

Further, when job lookup list information is input from the print job storing section 42, the screen preparing application 47 prepares a screen (see FIG. 8) that displays, in the form of a lookup list, the print jobs included in the job lookup list information. Further, the screen preparing application 47 outputs, to the server side communication section 41, the screen information relating to the screen prepared as such. If this occurs, the server side communication section 41 transmits the screen information to the multi-function printer 20.

The server side usage information management section 48 includes a server side usage information storing section 481 that stores the usage information received from the multi-function printer 20 through the server side communication section 41. In the server side usage information, storing section 481, the usage information is stored in a state where information specifying the composition machine 20 that transmits the usage information is caused to correlates to a user (in this case, a server side account) who uses the specified multi-function printer 20.

Hereinafter, with reference to FIG. 6 to FIG. 10, a description will be made of screens which is displayed on the display screen 232 of the multi-function printer 20.

Figure 6:
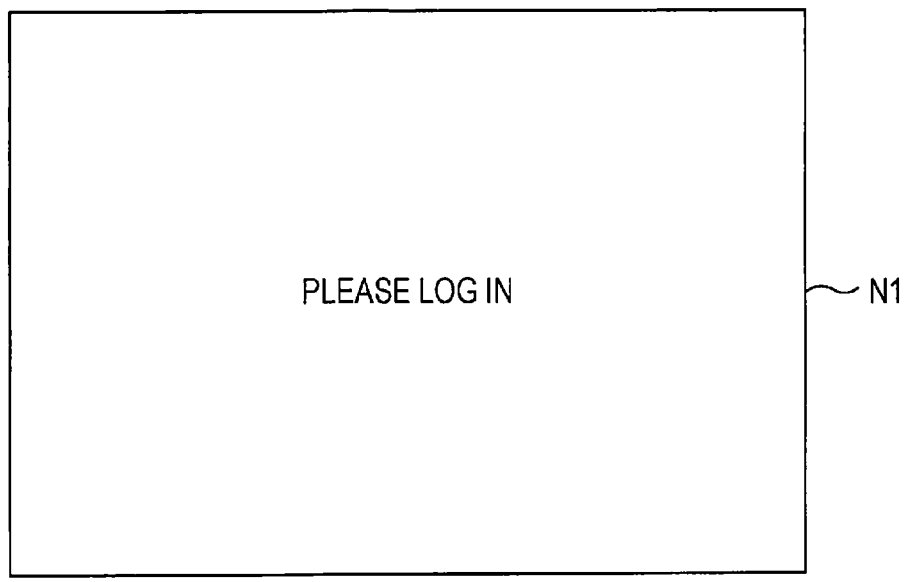
FIG. 6 is a diagram showing a screen which prompts to log in n to a multi-function printer.

A screen shown in FIG. 6 is a login screen N1 which is displayed in order to prompt a user to login to the multi-function printer 20 when the multi-function printer 20 comes into a logoff state. The login screen N1 is a native screen which is previously prepared in the control device 24 of the multi-function printer 20.

Figure 7:
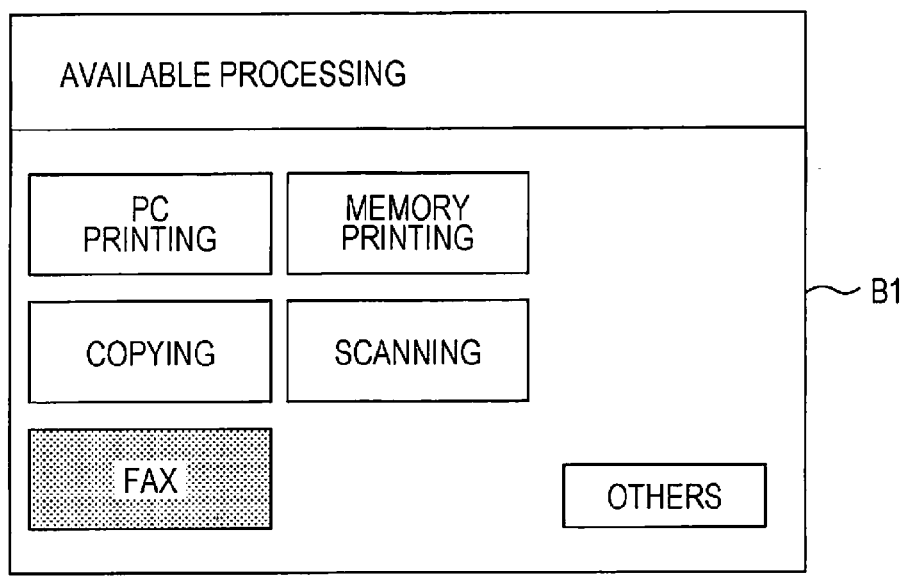
FIG. 7 is a diagram showing an example of a screen displaying processing of which a usage is permitted by both of a multi-function printer and a management server.

A screen shown in FIG. 7 is an example of a screen in a case where it is possible for the multi-function printer 20 and the management server 40 to communicate with each other and a user logs in to the multi-function printer 20. The screen is an example of a processing selection screen B1 that displays, in the form of a lookup list, processing of which a usage is permitted by both of the multi-function printer 20 and the management server 40. In other words, in the case of FIG. 7, the PC printing, the memory printing, the copying and the scanning are permitted to executed, while the FAX is not permitted to be executed. For this reason, for example, in a case where "PC printing" is selected on the processing selection screen B1, the PC printing is executed in the multi-function printer 20, while it is difficult to select the FAX on the processing selection screen B1. On the other hand, in a case where "others" is displayed to be selectable and also the "others" is selected on the processing selection screen B1, various types of maintenance or settings in the multi-function printer 20 can be performed. Further, such a processing selection screen B1 is a browser screen which is prepared in the management server 40.

Figure 8:
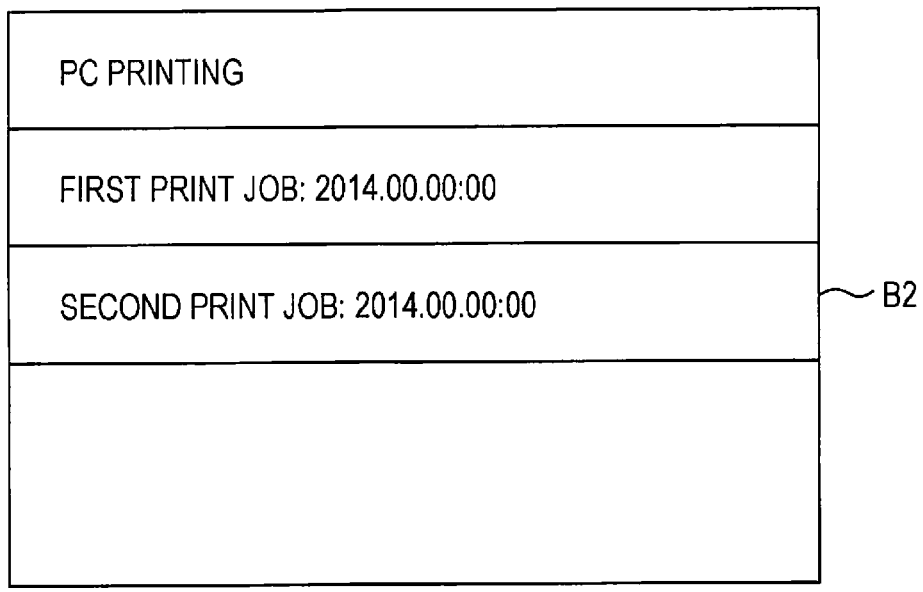
FIG. 8 is a diagram showing an example of a screen in which selectable print job is illustrated in the form of a look-up list.

A screen shown in FIG. 8 is an example of a screen in a case where "PC printing" is selected on the processing selection screen B1. The screen is an example of a job list screen B2 that displays, in the form of a lookup list, print jobs which a user can select. Further, for example, in a case where "the first print job" is selected on the job list screen B2, the PC printing based on the first print job is executed in the multi-function printer 20. Further, such a job list screen B2 is a browser screen which is prepared in the management server 40.

Figure 9:
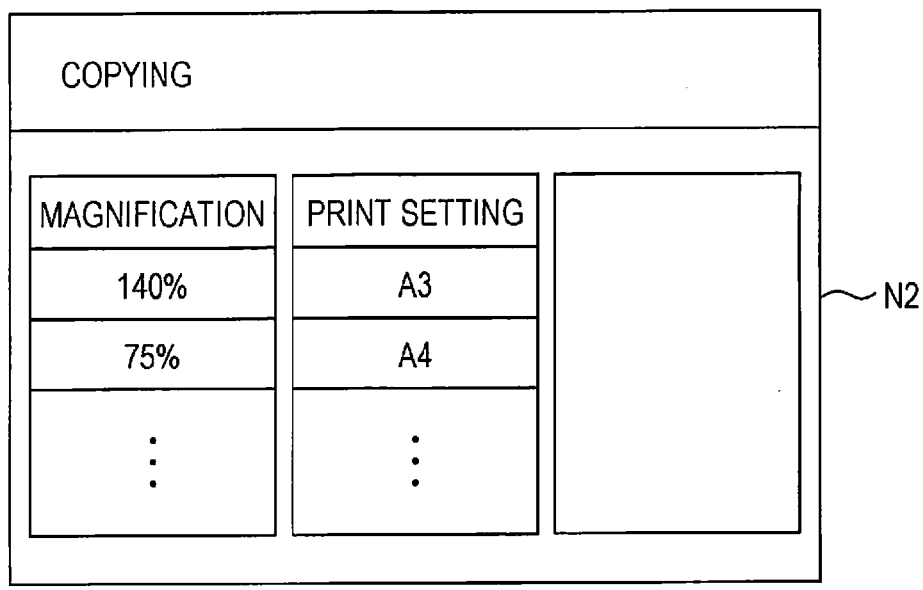
FIG. 9 is a diagram showing an example of a screen which urge a user to select options having various types of conditions before copying is executed.

A screen shown in FIG. 9 is an example of a screen in a case where a user requests execution of copying. The screen is a condition selection screen N2 that urges a user to select options from various types of conditions (magnification, a size of paper, and the like) when the copying is executed. Further, the condition selection screen N2 that urges a user to select option from execution conditions of reception unrequired processing such as the copying is a native screen which is previously prepared in the multi-function printer 20.

Figure 10:
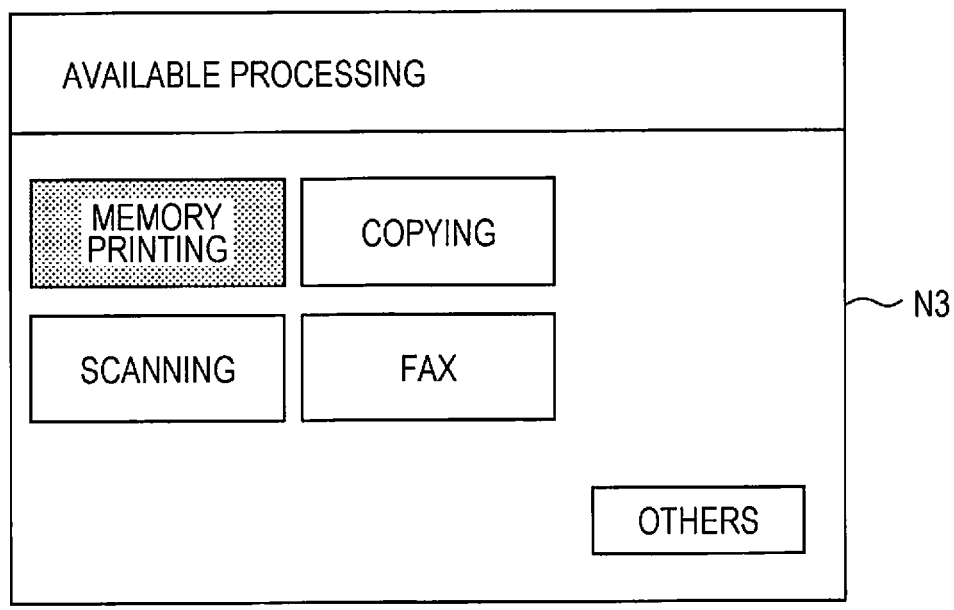
FIG. 10 is a diagram showing an example of a screen displaying processing of which a usage is permitted by a multi-function printer.

A screen shown in FIG. 10 is an example of a screen in a case where it is difficult for the multi-function printer 20 and the management server 40 to communicate with each other and a user uses an N-TH apparatus side account X(N) to log in to the multi-function printer 20. The screen is an example of a processing selection screen N3 that displays, in the form of a lookup list, processing of which a usage is permitted by the multi-function printer 20. In other words, in the case of FIG. 10, the copying, the scanning and the FAX is permitted to be executed, while the memory printing is prohibited from being executed. For this reason, for example, in a case where "scanning" is selected on the processing selection screen N3, the scanning is executed in the multi-function printer 20, meanwhile it is difficult to select "memory printing" on the processing selection screen N3. Further, such a processing selection screen N3 is a native screen which is prepared in the multi-function printer 20.

Hereinafter, with reference to the flow chart shown in FIG. 11, in a state where it is possible for the multi-function printer 20 and the management server 40 to communicate with each other, a description will be made of processing procedures when a user logs in to the multi-function printer 20.

Figure 11:
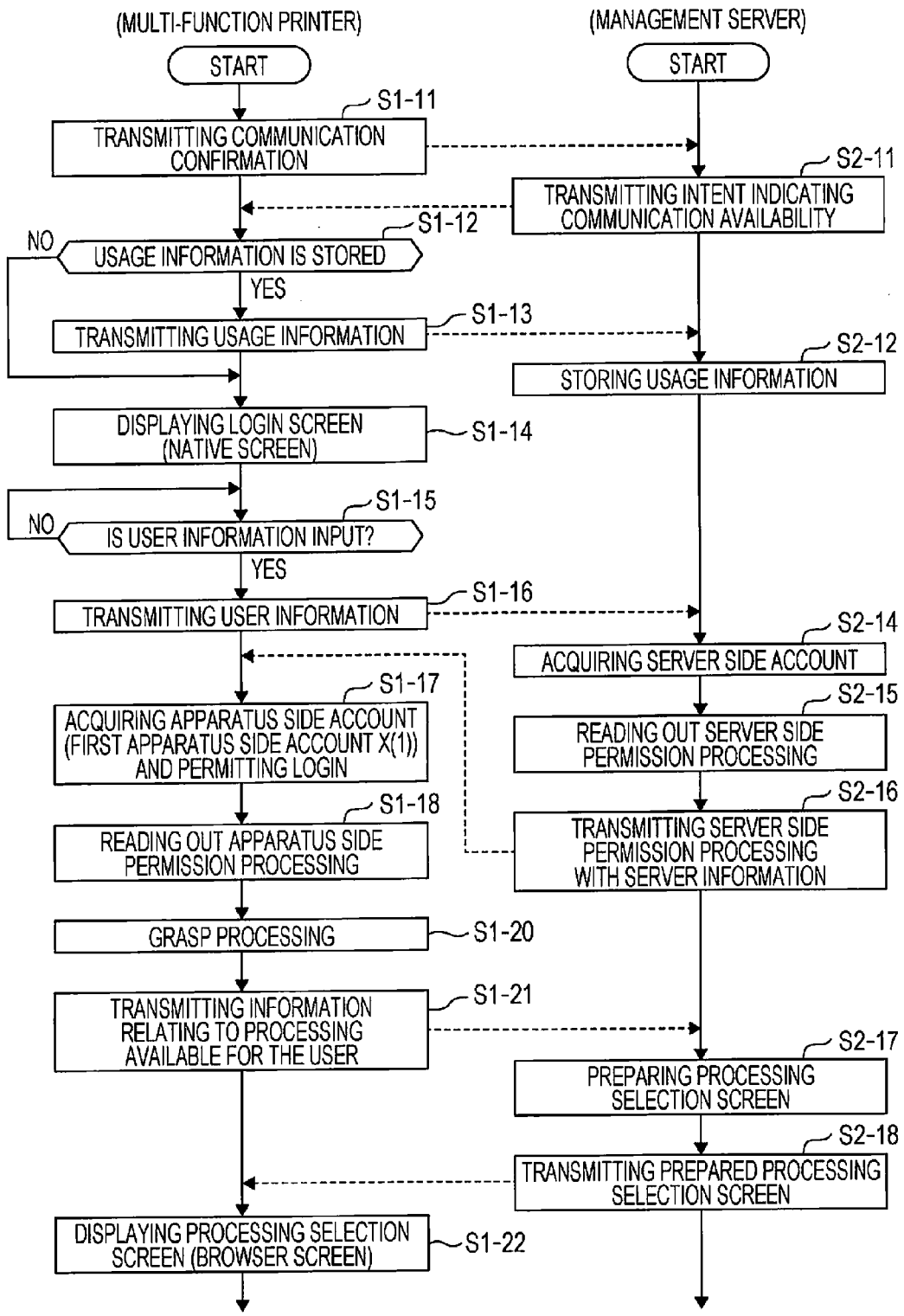
FIG. 11 is a flow chart explaining processing procedures when a user logs in to a multi-function printer in a state where it is possible for a multi-function printer and a management server to communicate with each other.

As shown in FIG. 11, if the power source of the multi-function printer 20 is turned on, communication confirmation is transmitted to the management server 40 from the control device 24 of the multi-function printer 20 (Step S1-11). Further, when the communication confirmation is received from the multi-function printer 20, the management server 40 transmits intent of communication availability to the multi-function printer 20 in response to the received communication confirmation (Step S2-11). When such intent of communication availability is received, the multi-function printer 20 determines that it is possible to communicate with the management server 40.

Subsequently, the control device 24 of the multi-function printer 20 determines whether or not usage information is stored in the apparatus side usage information storing section 382 (Step S1-12). In a case where the usage information is stored in the apparatus side usage information storing section 382 (Step S1-12:YES), the control device 24 of the multi-function printer 20 transmits the usage information to the management server 40 (Step S1-13), and the process proceeds to Step S1-14 to be described later.

If this occurs, the management server 40 causes the received usage information to be stored in the server side usage information storing section 481 (Step S2-12). The server side usage information storing section 481 stores the usage information in a state where information specifying the multi-function printer 20 that transmits the usage information is caused to correlate to a user (in this case, server side account) who uses the multi-function printer 20.

On the other hand, in a case where the usage information is not stored in the apparatus side usage information storing section 382 (Step S1-12:NO), the control device 24 of the multi-function printer 20 causes Step S1-13 to not be executed, and the process proceeds to the following Step S1-14.

In Step S1-14, the control device 24 of the multi-function printer 20 causes the login screen N1 shown in FIG. 6 to be displayed on the display screen 232. Subsequently, the control device 24 of the multi-function printer 20 determines whether or not the user information is input through the reception section 233 of the user interface 23 (Step S1-15). In a case where the user information is still not input (Step S1-15:NO), the control device 24 of the multi-function printer 20 repeatedly executes determination processing of Step S1-15 until the user information is input. On the other hand, in a case where the user information is input (Step S1-15:YES), the control device 24 of the multi-function printer 20 causes the input user information to be transmitted to the management server 40 (Step S1-16). In this regard, Step S1-16 constitutes an example of "a user information transmission step" in which the user information is caused to be transmitted to the management server 40 when the user information is input in order to log in to the multi-function printer 20.

Further, in the management server 40 which receives the user information, a server side account (for example, the first server side account Y(1)) specified from the received user information is acquired (Step S2-14). In this regard, Step S2-14 constitutes an example of "a server side account acquirement step". Subsequently, the management server 40 reads out a server side permission processing correlating to the acquired server side account (Step S2-15). For example, in a case where a server side account acquired in Step S2-14 is the first server side account Y(1), the PC printing, the copying, the scanning and the FAX are read out as the server side permission processing (see FIG. 5). In this regard, Step S2-15 constitutes an example of "a server side read step". Further, the management server 40 causes information relating to the read-out server side permission processing accompanying the server side information to be transmitted to the multi-function printer 20 (Step S2-16).

If this occurs, the control device 24 of the multi-function printer 20 causes an apparatus side account (in this case, the first apparatus side account X(1)) specified from the received server information to be acquired, and a login to the multi-function printer 20 is permitted (Step S1-17). In this regard, Step S1-17 constitutes an example of "a apparatus side account acquirement step" which causes the apparatus side account to be acquired according to the inputting of the user information for logging in to the multi-function printer 20. Further, in this case, the user achieves the login to the multi-function printer 20 using the first apparatus side account X(1).

Subsequently, the control device 24 of the multi-function printer 20 causes apparatus side permission processing correlating to the acquired apparatus side account to be read out (Step S1-18). For example, in a case where the apparatus side account acquired in the Step S1-17 is the first apparatus side account X(1), the PC printing, the memory printing, the copying, and the scanning is read out as the apparatus side permission processing. In this regard, Step S1-18 constitutes an example of "an apparatus side read step".

Further, the control device 24 of the multi-function printer 20, which already receives the server side permission processing, compares the apparatus side permission processing with the server side permission processing, and causes grasp processing to be executed. The grasp processing is used to grasp processing of which a usage is permitted by both of the multi-function printer 20 and the management server 40 (Step S1-20). For example, in a case where the server side account is the first server side account Y(1) and the apparatus side account is the first apparatus side account X(1), the processing of which a usage is permitted by both of the multi-function printer 20 and the management server 40 is the PC printing, the copying and the scanning. In other words, these three kinds of processing (the PC printing, the copying and the scanning) are available for the user. Subsequently, the control device 24 of the multi-function printer 20 causes information relating to the processing available for the user to be transmitted to the management server 40 (Step S1-21).

In the management server 40 which receives the information relating to the processing available for the user, the processing selection screen B1 shown in FIG. 7 is prepared (Step S2-17). Further, the management server 40 causes screen information relating to the prepared processing selection screen B1 to be transmitted to the multi-function printer 20 (Step S2-18).

The control device 24 of the multi-function printer 20, which receives the screen information, causes a processing selection screen B1 based on the screen information to be displayed on the display screen 232 (Step S1-22). In this regard, Step S1-22 constitutes an example of "an execution permission step" which permits execution of the processing of which a usage is permitted by both of the management server 40 and the multi-function printer 20. Accordingly, it is possible for the user to select any one of the PC printing, the copying and the scanning.

Subsequently, with reference to the flow chart shown in FIG. 12, a description will be made of the processing procedures when the user requests execution of the PC printing in a state where the first apparatus side account X(1) is used to log in to the multi-function printer 20.

Figure 12:
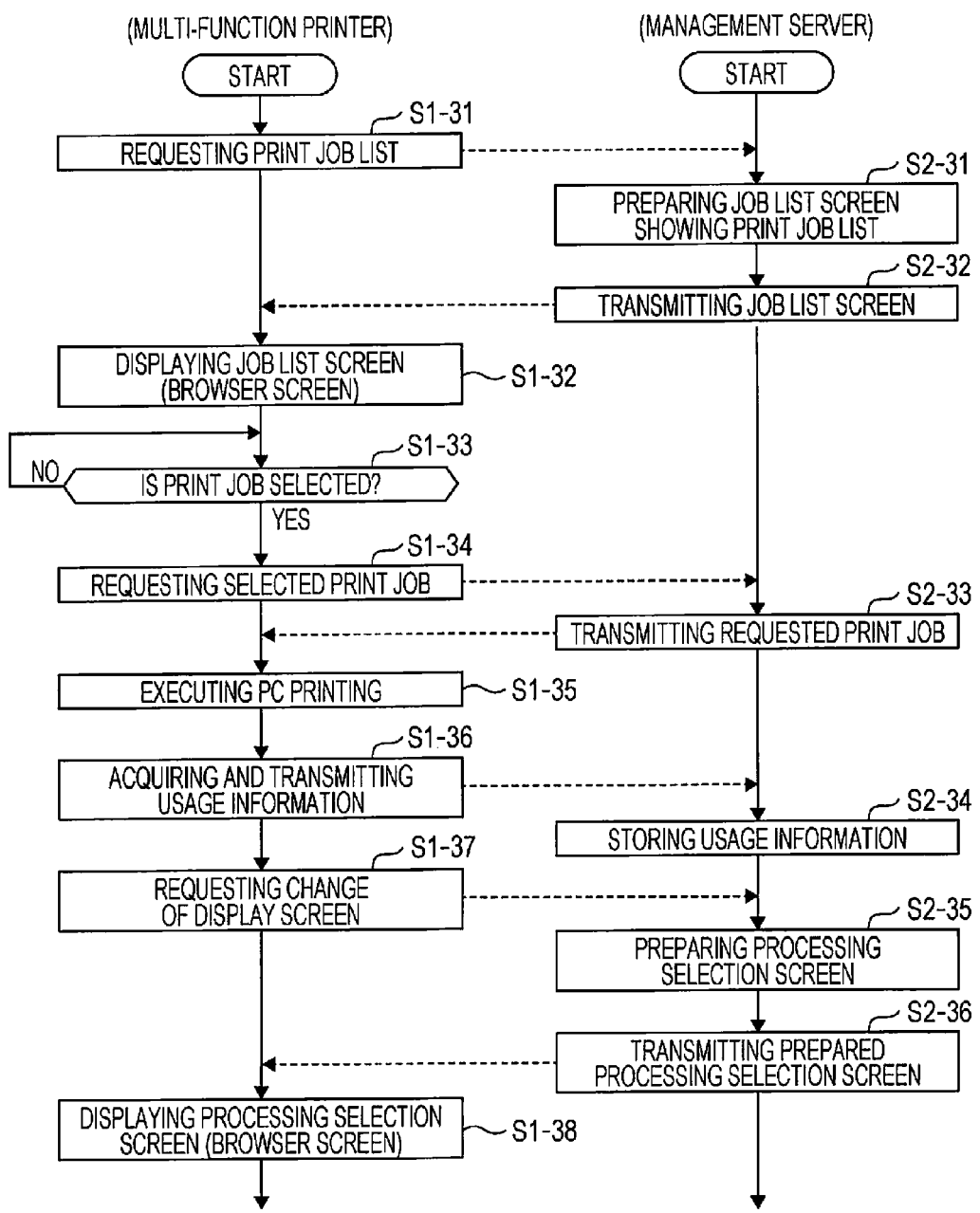
FIG. 12 is a flow chart explaining processing procedures when a user requests execution of PC printing in a state where a communicative apparatus side account is used to log in to a multi-function printer.

As shown in FIG. 12, when a request for the PC printing is input, the control device 24 of the multi-function printer 20 causes an intent to be transmitted to the management server 40, and the transmitted intent indicates that the user requests a print job list which corresponds to a lookup list of the print jobs representing the available PC printing (Step S1-31).

Further, the management server 40, which receives the request, prepares the print job list and the job list screen B2 (see FIG. 8) representing the prepared job list (Step S2-31). Subsequently, the management server 40 causes screen information relating to the prepared job list screen B2 to be transmitted to the multi-function printer 20 (Step S2-32).

The control device 24 of the multi-function printer 20, which receives the screen information, causes the job list screen B2 based on the received screen information to be displayed on the display screen 232 (Step S1-32). Further, the control device 24 of the multi-function printer 20 determines whether or not a print job is selected by the user (Step S1-33). In a case where a print job is still not selected (Step S1-33: NO), the control device 24 of the multi-function printer 20 repeatedly executes the determination processing of Step S1-33 until a print job is selected. On the other hand, in a case where a print job is selected (Step S1-33:YES), the control device 24 of the multi-function printer 20 causes an intent indicating that the selected print job is requested to be transmitted to the management server 40 (Step S1-34).

The management server 40, which receives the request described above, causes the requested print job to be transmitted to the multi-function printer 20 (Step S2-33).

Further, the control device 24 of the multi-function printer 20, which receives the print job, causes the PC printing based on the received print job to be executed (Step S1-35). In this regard, Step S1-35 constitutes an example of "a control step" which causes processing permitted in the execution permission step (Step S1-22) to be executed when the execution of the permitted processing is requested. Further, when the execution of the PC printing is finished, the control device 24 of the multi-function printer 20 acquires usage information, and transmits the acquired usage information to the management server 40 (Step S1-36).

The management server 40, which receives the usage information, causes the received usage information to be stored in the server side usage information storing section 481 (Step S2-34).

The control device 24 of the multi-function printer 20, which transmits the usage information, causes an intent indicating that change of the display screen is requested to be transmitted to the management server 40 (Step S1-37).

The management server 40, which receives the request, prepares the processing selection screen B1 showing the processing available for the user (Step S2-35). Further, the management server 40 transmits the screen information relating to the prepared processing selection screen B1 to the multi-function printer 20 (Step S2-36).

The control device 24 of the multi-function printer 20, which receives the screen information, causes the processing selection screen B1 based the screen information to be displayed on the display screen 232 (Step S1-38). Accordingly, it is possible for the user to select any one of the PC printing, the copying and the scanning.

Hereinafter, with reference to the flow chart shown in FIG. 13, a description will be made of processing procedures when a user requests execution of the copying in a state where the first apparatus side account X(1) is used to log in to the multi-function printer 20.

Figure 13:
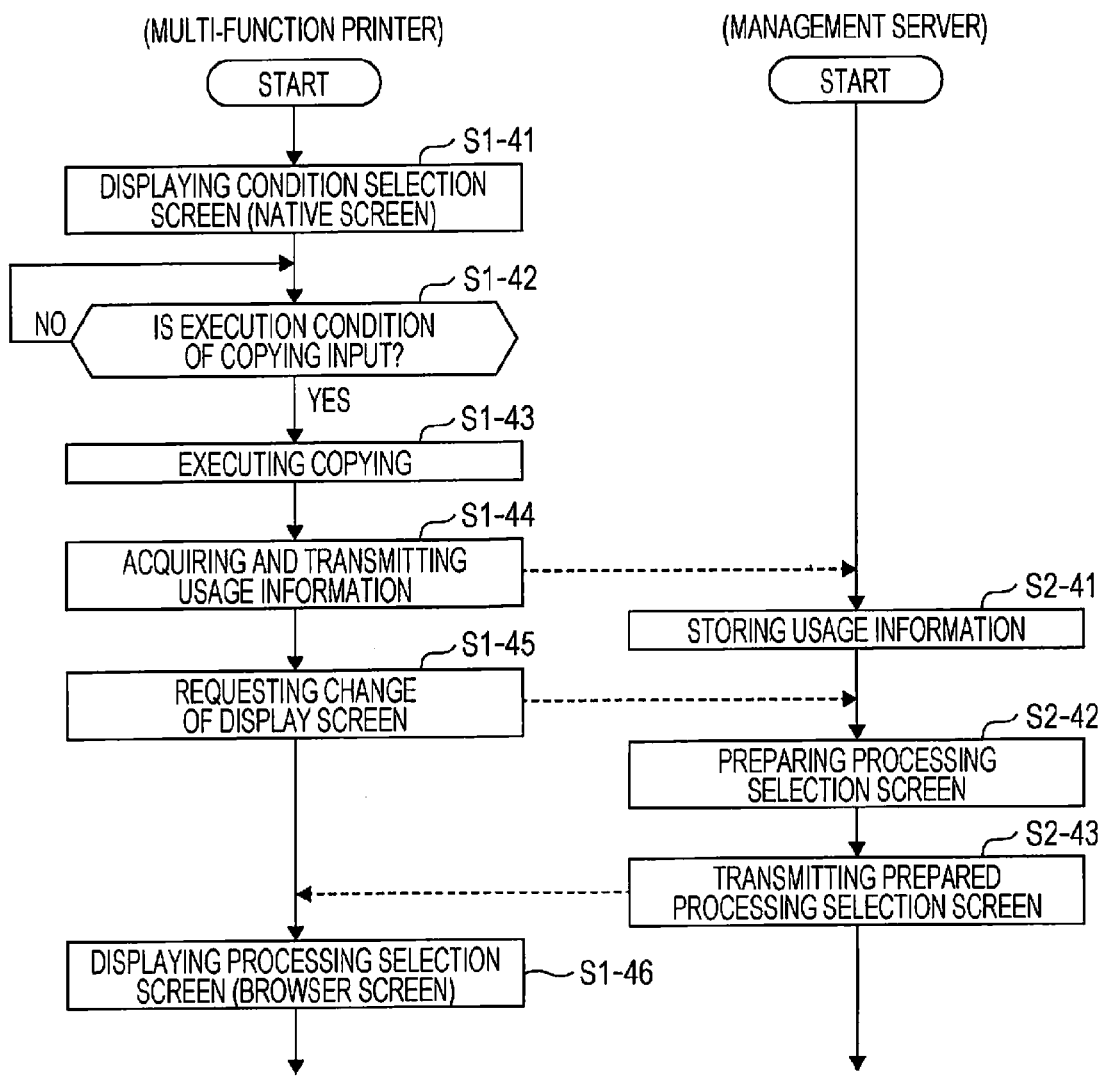
FIG. 13 is a flow chart explaining processing procedures when a user requests execution of copying in a state where a communicative apparatus side account is used to log in to a multi-function printer.

As shown in FIG. 13, when the request for the copying is input, the control device 24 of the multi-function printer 20 causes the condition selection screen N2 shown in FIG. 9 to be displayed on the display screen 232 (Step S1-41). Further, the control device 24 of the multi-function printer 20 determines whether or not execution conditions of the copying (magnification, a size of paper, sheet numbers and the like) are input by a user (Step S1-42). In a case where the execution condition is still not input (Step S1-42:NO), the control device 24 of the multi-function printer 20 repeatedly executes the determination processing of Step S1-42 until the execution condition is input. On the other hand, in a case where the execution condition is input (Step S1-42:YES), the control device 24 of the multi-function printer 20 causes the copying to be executed according to the input execution condition (Step S1-43). In this regard, Step S1-43 constitutes an example of "a control step" in which, when the processing permitted in the execution permission step (Step S1-22) is requested to be executed, the requested processing is caused to be executed accordingly. Further, if the execution of the copying is finished, the control device 24 of the multi-function printer 20 acquires the usage information and causes the acquired usage information to be transmitted to the management server 40 (Step S1-44).

The management server 40, which receives the usage information, causes the usage information to be stored in the server side usage information storing section 481 (Step S2-41).

The control device 24 of the multi-function printer 20, which transmits the usage information, causes an intent indicating that change of the display screen is requested to be transmitted to the management server 40 (Step S1-45).

The management server 40, which receives the request, prepares the processing selection screen B1 showing the processing available for the user (Step S2-42). Further, the management server 40 transmits, to the multi-function printer 20, the screen information relating to the prepared processing selection screen B1 (Step S2-43).

The control device 24 of the multi-function printer 20, which receives the screen information, causes the processing selection screen B1 based on the screen information to be displayed on the display screen 232 (Step S1-46). Accordingly, it is possible for the user to select any one of the PC printing, the copying and the scanning.

Hereinafter, with reference to the flow chart shown in FIG. 14, a description will be made of processing procedures when the multi-function printer 20 comes into a logoff state.

Figure 14:
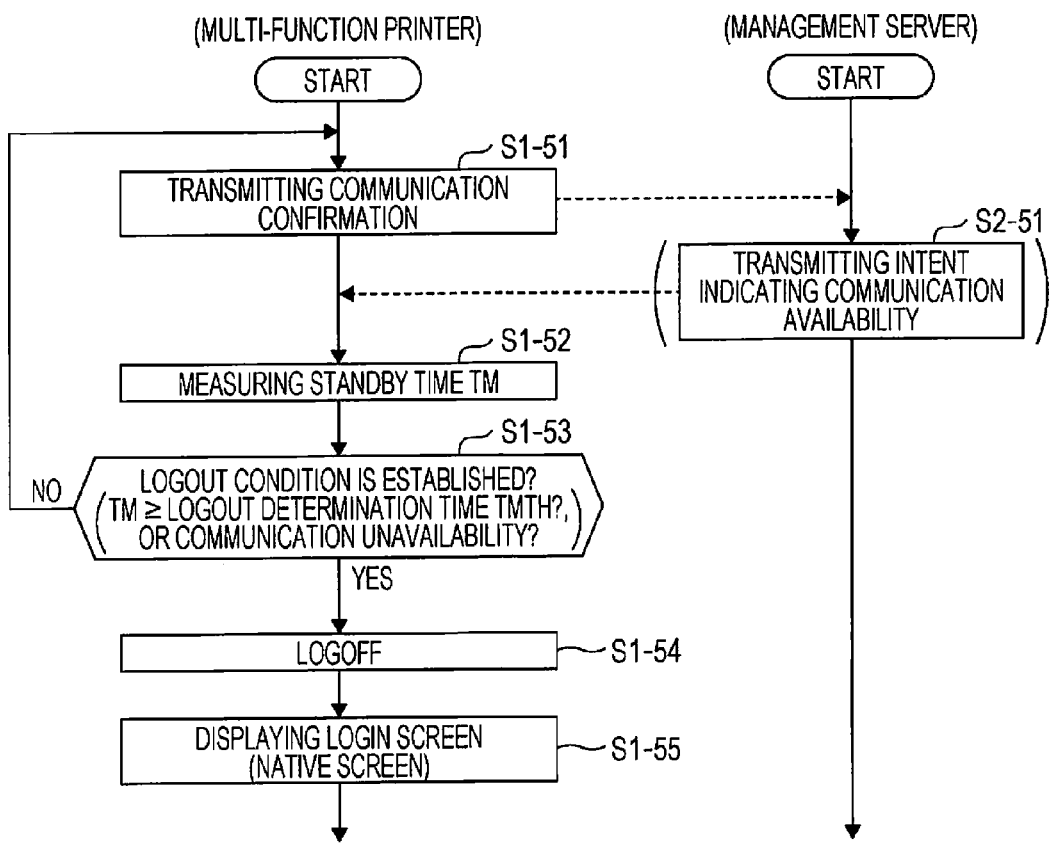
FIG. 14 is a flow chart explaining processing procedures when a multi-function printer comes into a logoff state.

As shown in FIG. 14, in a case where the multi-function printer 20 is logged in using the first apparatus side account X(1), and is on standby, the control device 24 of the multi-function printer 20 causes a communication confirmation to be transmitted to the management server 40 (Step S1-51).

Herein, in a case where it is possible for the multi-function printer 20 and the management server 40 to communicate with each other, the management server 40 receives the communication confirmation from the multi-function printer 20 and transmits intent of communication availability to the multi-function printer 20 in response to the communication confirmation (Step S2-51). On the other hand, in a case where it is difficult for the multi-function printer 20 and the management server 40 to communicate with each other due to a failure of the network 11, a breakdown of the management server 40, or the like, the management server 40 do not receives the communication confirmation from the multi-function printer 20. In this case, the management server 40 does not execute the processing of Step S2-51. Further, in a case where it is difficult to receive the intent of communication availability, the control device 24 of the multi-function printer 20 can determine that it is difficult to communicate with the management server 40.

Further, the control device 24 of the multi-function printer 20, which transmits the communication confirmation, causes a standby time TM representing a duration time of the standby to be measured (Step S1-52). Subsequently, the control device 24 of the multi-function printer 20 determines whether or not a logout condition is established (Step S1-53). The processing management system 10 of the embodiment can determine that the logout condition is established when at least one of two conditions is established, one condition being that the standby time TM is a predetermined time TMTh or more, the other condition being that it is difficult for the multi-function printer 20 and the management server 40 to communicate with each other. Further, in a case where the logout condition is not established (Step S1-53:NO), the control device 24 of the multi-function printer 20 causes the processing thereof to proceed to Step S1-51 described above.

On the other hand, in a case where the logout condition is established (Step S1-53:YES), the control device 24 of the multi-function printer 20 performs the logout (Step S1-54), and causes the login screen N1 shown in FIG. 6 to be displayed on the display screen 232 (Step S1-55). In other words, the control device 24 of the multi-function printer 20 causes the multi-function printer 20 to come into a logoff states and become capable of receiving login to the multi-function printer 20 when it is difficult for the multi-function printer 20 and the management server 40 to communicate with each other in a state where a login to the multi-function printer 20 is performed using the first apparatus side account X(1) which is a communicative apparatus side account.

Subsequently, with reference to the flow chart shown in FIG. 15, a description will be made of processing procedures when a user logs in to the multi-function printer 20 using an N-TH apparatus side account X(N) and requests the execution of the copying because it is difficult for the multi-function printer 20 and the management server 40 to communicate with each other.

Figure 15:
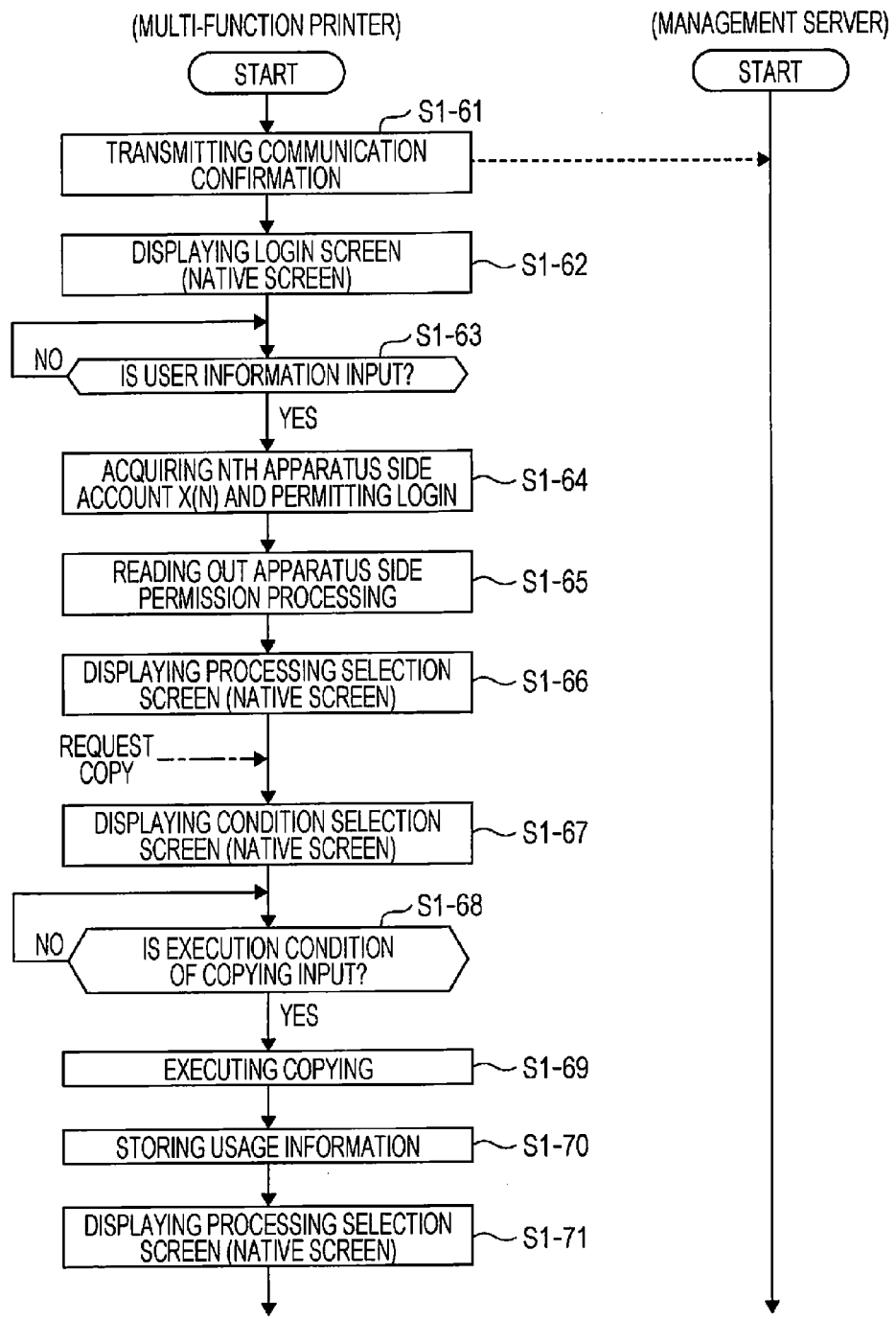
FIG. 15 is a flow chart explaining processing procedures when a user requests execution of copying and a uncommunicative apparatus side account is used to log in to a multi-function printer in a state where it is difficult for the multi-function printer and a management server to communicate with each other.

As shown in FIG. 15, when a power source of the multi-function printer 20 is turned on, the control device 24 of the multi-function printer 20 causes the communication confirmation to be transmitted to the management server 40 (Step S1-61). In this case, however, the communication confirmation is not received by the management server 40, or even though the communication confirmation is received by the management server 40, the response thereof is not received by the multi-function printer 20.

Subsequently, the control device 24 of the multi-function printer 20 causes the login screen N1 shown in FIG. 6 to be displayed on the display screen 232 (Step S1-62). Further, the control device 24 of the multi-function printer 20 determines whether or not the user information is input through the reception section 233 of the user interface 23 (Step S1-63). In a case where the user information is still not input (Step S1-63:NO), the control device 24 of the multi-function printer 20 repeatedly executes the determination processing of Step S1-63 until the user information is input. On the other hand, in a case where the user information is input ('Step S1-63:YES), taking the opportunity of the input of the user information, the control device 24 of the multi-function printer 20 acquires a N-TH apparatus side account X(N) which is a uncommunicative apparatus side account, and the login to the multi-function printer 20 is permitted (Step S1-64). In this case, the user logs in to multi-function printer 20 using the N-TH apparatus side account X(N).

Subsequently, the control device 24 of the multi-function printer 20 reads out the apparatus side permission processing correlating to the acquired N-TH apparatus side account X(N) (Step S1-65). For example, the memory printing, the copying, the scanning and the FAX is read out as the apparatus side permission processing (see FIG. 4). Further, the control device 24 of the multi-function printer 20 causes a processing selection screen N3 to be prepared, but herein the prepared processing selection screen N3 is a lookup list which includes the processing (in this case, the memory printing, the copying, the scanning and the FAX) of which an execution is permitted by the multi-function printer 20. Further, the control device 24 of the multi-function printer 20 causes the processing selection screen N3 to be displayed on the display screen 232 (Step S1-66).

When a request of the copying is input by a user in a state such a processing selection screen N3 is displayed on the display screen 232, the control device 24 of the multi-function printer 20 causes the condition selection screen N2 shown in FIG. 9 to be displayed on the display screen 232 (Step S1-67). Further, the fact that the copying is requested indicates that "copying" is selected on the condition selection screen N2. Subsequently, the control device 24 of the multi-function printer 20 determines whether or not execution conditions of the copying (magnification, a size of paper, sheet numbers and the like) are input by the user (Step S1-68). In a case where the execution conditions of the copying are still not input (Step S1-68:NO), the control device 24 of the multi-function printer 20 repeatedly executes the determination processing of Step S1-68 until the execution conditions are input. On the other hand, in a case where the execution condition is input (Step S1-68:YES), the control device 24 of the multi-function printer 20 causes the copying to be executed according to the input execution condition (Step S1-69).

Further, when the execution of the copying is finished, the control device 24 of the multi-function printer 20 acquires the usage information, and causes the acquired usage information to be stored in the apparatus side usage information storing section 382 (Step S1-70). Subsequently, the control device 24 of the multi-function printer 20 causes the condition selection screen N2 shown in FIG. 9 to be displayed on the display screen 232 (Step S1-71).

As described above, according to the processing management system 10 of the embodiment, it is possible to attain the following effects.

(1) When the user information is input to the multi-function printer 20, the user information is transmitted to the management server 40. If this occurs, the management server 40 acquires the server side account which is specified from the user information received from the multi-function printer 20, and causes the server side permission processing relating to the acquired server side account to be read out from the server side management section 45. Further, the multi-function printer 20, which receives the user information, acquires the apparatus side account and performs a login using the acquired apparatus side account. If this occurs, the apparatus side permission processing correlating to the apparatus side account is read out from the apparatus side management section 34. Accordingly, in the multi-function printer 20, based on the server side permission processing read out in the management server 40 and the apparatus side permission processing read out in the multi-function printer 20, the processing of which a usage is permitted by both of the multi-function printer 20 and the management server 40 is permitted to be executed. In other words, according to the processing management system 10 of the embodiment, the processing permitted to be used in the multi-function printer 20 is managed not only by the apparatus side account which is managed in the multi-function printer 20 but also by the server side account which is managed in the management server 40. Accordingly, even in a case where there is a possibility that the number of users who use the electronic apparatus is greater than the number of the apparatus side accounts capable of being managed by the multi-function printer 20, it is possible to set, for each user, the processing of which a usage is permitted by the multi-function printer 20. Therefore, even though the number of users are large, it is possible to individually set, for each user, the processing of which a usage is permitted by the multi-function printer 20.

(2) The multi-function printer 20, which transmits the user information to the management server 40, receives the server information, and acquires the first apparatus side account X(1) specified from the received server information, as a communicative apparatus side account. If this occurs, the first apparatus side account X(1) is used to perform a login, and an apparatus side permission processing correlating to the first apparatus side account X(1) is acquired from the apparatus side management section 34. As a result, based on the acquired apparatus side permission processing and the server side permission processing acquired by the management server 40, it is possible to determine which processing of which a usage is permitted by both of the multi-function printer 20 and the management server 40. If this occurs, it is possible for the multi-function printer 20 to provide the processing of which a usage is permitted by both of the multi-function printer 20 and the management server 40, for a user who inputs the user information.

(3) Further, when the multi-function printer 20 is used to execute the processing (for example, the PC printing), usage information relating to the execution of the processing is transmitted to the management server 40, the management server 40 stores the received usage information. As a result, it is possible for the management server 40 to grasp a usage state of the multi-function printer 20 for each server side account (that is, for each user). The usage information is acquired and stored as described above, and thus it is possible to easily perform a fee charging service and the like for each user (or, for each group composed of a plurality of users).

(4) On the other hand, a user may use the multi-function printer 20 in a state where it is difficult for the multi-function printer 20 and the management server 40 to communicate with each other. In this case, when the user information is input to the multi-function printer 20, the multi-function printer 20 acquires the N-TH apparatus side account X(N) which is a uncommunicative apparatus side account, and thus the N-TH apparatus side account X(N) is used to perform a login. If this occurs, the apparatus side permission processing correlating to the N-TH apparatus side account X(N) is read out from the apparatus side management section 34, and execution of the apparatus side permission processing is permitted in the multi-function printer 20. Accordingly, not only the communicative apparatus side account but also the uncommunicative apparatus side account is prepared and thus it is possible for a user to use the multi-function printer 20 even in a case where it is difficult for the multi-function printer 20 and the management server 40 to communicate with each other.

(5) Further, in a case where a user uses the multi-function printer 20 in a state where an N-TH apparatus side account X(N) is used to log in to the multi-function printer 20, the usage information prepared during the user's usage is stored in the apparatus side usage information storing section 382. The usage information stored in the apparatus side usage information storing section 382 is transmitted to the management server 40 when it is possible for the multi-function printer 20 and the management server 40 to communicate with each other. Accordingly, it is possible for the management server 40 to grasp a usage state of the multi-function printer 20 during a time when it is difficult for the management server 40 and the multi-function printer 20 to communicate with each other.

(6) Further, there may be a case where it is difficult for the multi-function printer 20 and the management server 40 to communicate with each other in a state where a user uses the first apparatus side account X(1) to attain a login to the multi-function printer 20. In this case, when detecting that it is difficult for the multi-function printer 20 and the management server 40 to communicate with each other, the multi-function printer 20 applied to the processing management system 10 of the embodiment automatically performs a logoff to thereby make a state where a login to the multi-function printer 20 is available. In this state, when the user information is input to the multi-function printer 20, an N-TH apparatus side account X(N) which is a uncommunicative apparatus side account is used to perform a login to the multi-function printer 20. As a result, even when it is difficult for the multi-function printer 20 and the management server 40 to communicate with each other, it is possible for the multi-function printer 20 to execute the copying and the like which, however, are limited only to the reception unrequired processing.

Second Embodiment

Hereinafter, the second embodiment relating to a processing management system, and electronic apparatus, a management server and a processing management method of an electronic apparatus will be described with reference to FIG. 16 to FIG. 19. Further, the second embodiment is different from the first embodiment in that the processing management system has a plurality of management servers. Therefore, in the description provided below, the different portions between the second embodiment and the first embodiment will be mainly described, and the same portions thereof will not be repeated with like numbers assigned to like elements.

Figure 16:
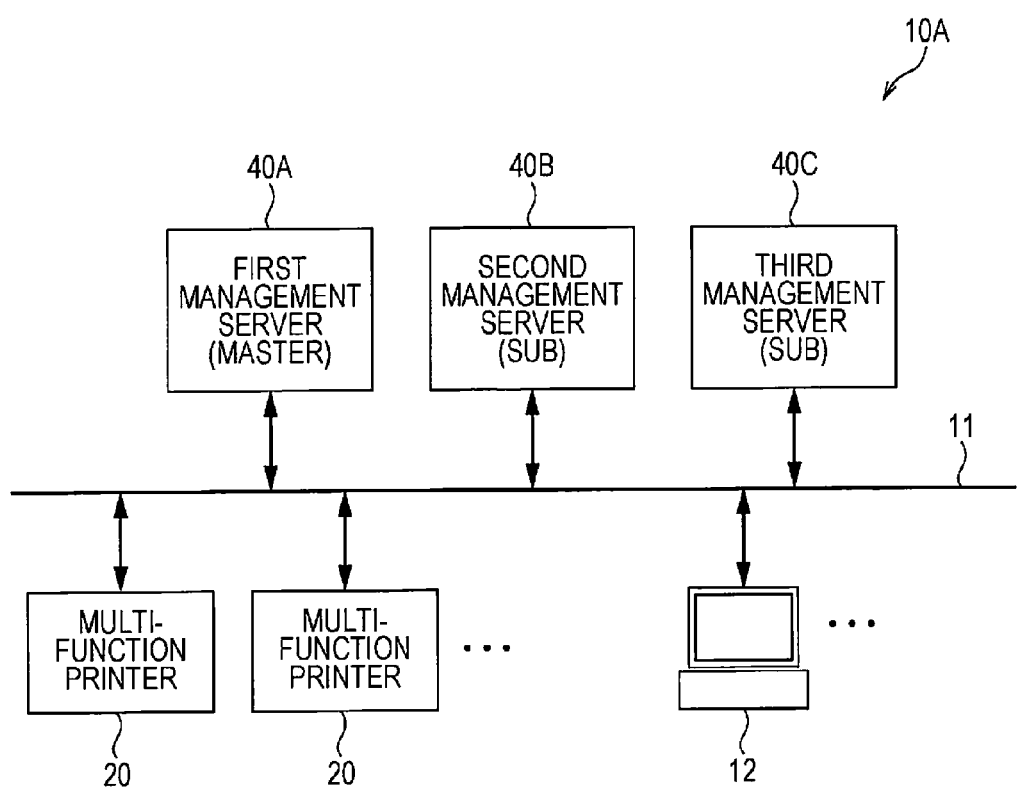
FIG. 16 is a schematic configuration diagram showing a processing management system of a second embodiment.

As shown in FIG. 16, the processing management system 10A of the embodiment includes a plurality (three) of management servers 40A, 40B and 40C which is connected to the network 11. A first management server 40A among the management servers 40A to 40C is a master server that generally manages the system and the second management server 40B and the third management server 40C are sub-servers. Further, each of the management servers 40A to 40C can communicates with a plurality of multi-function printers 20 and a plurality of information terminals 12 through a network 11.

The multi-function printer 20 applied to such a processing management system 10 is previously provided with apparatus side accounts for each of the management servers 40A to 40C.

In other words, as shown in FIG. 17, the first apparatus side account X(1) correlates to the first management server 40A, the second apparatus side account X(2) correlates to the second management server 40B, and the third apparatus side account X(3) correlates to the third management server 40C. In other words, the first to third apparatus side accounts X(1), X(2) and X(3) are the communicative apparatus side accounts. On the other hand, the N-TH apparatus side account X(N) is a uncommunicative apparatus side account.

Further, in the processing management system 10A of the embodiment, many server side accounts are divided into a plurality (three) of groups, and are managed by the management servers 40A to 40C in a unit group-based manner. In other words, as shown in FIG. 18, the first management server 40A manages the first server side account Y(1) to the 100-TH server side account Y(100). Further, the second management server 40B manages the 101st server side account Y(101) to the 200-TH server side account Y(200). Further, the third management server 40C manages the 201st server side account Y(201) to the 300th server side account Y(300).

For this reason, in a case where a server side account specified from user information which is input to multi-function printer 20 is, for example, the 10-TH server side account Y(10), the multi-function printer 20 receives server information transmitted from the first management server 40A. Further, after this, a communication is performed between the multi-function printer 20 and the first management server 40A. Further, in a case where a server side account specified from user information which is input to multi-function printer 20 is, for example, the 110-TH server side account Y(110), the multi-function printer 20 receives server information transmitted from the second management server 40B. Further, after this, a communication is performed between the multi-function printer 20 and the second management server 40B. Further, in a case where a server side account specified from user information which is input to multi-function printer 20 is, for example, the 210-TH server side account Y(210), the multi-function printer 20 receives server information transmitted from the third management server 40C. Further, after this, a communication is performed between the multi-function printer 20 and the third management server 40C.

Hereinafter, with reference to the flow chart shown in FIG. 19, a description will be made of processing procedures when a user logs in to the multi-function printer 20 in a state where it is possible for the multi-function printer 20 and each of the management servers 40A to 40C to communicate with each other. Further, in this case, the server side account specified from the user information which is input to the multi-function printer 20 is assumed to be the server side account (for example, the 110-TH server side account Y(110)) which is managed by the second management server 40B.

As shown in FIG. 19, the control device 24 of the multi-function printer 20 causes the login screen N1 shown in FIG. 6 to be displayed on the display screen 232 (Step S1-91). Subsequently, the control device 24 of the multi-function printer 20 determines whether or not user information is input by a user through the reception section 233 of the user interface 23 (Step S1-92). In a case where the user information is still not input (Step S1-92:NO), the control device 24 of the multi-function printer 20 repeatedly executes the determination processing of Step S1-92 until the user information is input. On the other hand, in a case where the user information is input (Step S1-92:YES), the control device 24 of the multi-function printer 20 causes the input user information to be transmitted to the first management server 40A which is a master server (Step S1-93). In this regard, Step S1-93 constitutes an example of "a user information transmission step".

The first management server 40A, which receives the user information, specifies a management server that manages the server side account specified from the user information (Step S2-91). In other words, the first management server 40A is stored in the form of the table shown in FIG. 18. For this reason, it is possible for the first management server 40A to specify a management server (in this case, the second management server 40B) that manages the acquired server side account. The first management server 40A transmits, to the specified management server (in this case, the second management server 40B), an intent indicating a request for transmission of server information (Step S2-92). In this case, the first management server 40A, which receives the user information received from the multi-function printer 20, also transmits the received user information to the second management server 40B.

If this occurs, the second management server 40B acquires a server side account (for example, the 110-TH server side account Y(110)) which is specified from the user information transmitted from the multi-function printer 20 (Step S3-92). In this regard, Step S3-92 constitutes an example of "a server side account acquirement step". Further, the second management server 40B causes the server side permission processing correlating to the acquired server side account to be read out (Step S3-93). In this regard, Step S3-93 constitutes an example of "a server side read step". Subsequently, the second management server 40B transmits, to the multi-function printer 20, information relating to the server side permission processing which is read out in Step S3-93, along with server information specifying the second management server 40B (Step S3-94).

If this occurs, the control device 24 of the multi-function printer 20 acquires an apparatus side account (in this case, the second apparatus side account X(2)) which is specified from the received server information, and a login to the multi-function printer 20 is permitted (Step S1-94). In this regard, Step S1-94 constitutes an example of "an apparatus side account acquirement step". Further, in this case, the user uses the second apparatus side account X(2) to attain the login to the multi-function printer 20.

Subsequently, the control device 24 of the multi-function printer 20 causes the apparatus side permission processing correlating to the acquired apparatus side account to be read out (Step S1-95). In this regard, Step S1-95 constitutes an example of "an apparatus side read step". Further, the control device 24 of the multi-function printer 20 compares the apparatus side permission processing with the server side permission processing, and causes grasp processing to be executed, but herein the grasp processing is a process in which the processing of which a usage is permitted by both of the multi-function printer 20 and the second management server 40B grasped (Step S1-97). Subsequently, the control device 24 of the multi-function printer 20 causes information relating to the processing which is available for the user to be transmitted to the second management server 40B (Step S1-98).

The second management server 40B, which receives such information, prepares the processing selection screen B1 shown FIG. 7 (Step S3-95). Further, the second management server 40B transmits, to the multi-function printer 20, screen information relating to the prepared processing selection screen B1 (Step S3-96).

The control device 24 of the multi-function printer 20, which receives the screen information, causes the processing selection screen B1 based on the screen information to be displayed on the display screen 232 (Step S1-99). In this regard, Step S1-99 constitutes an example of "an execution permission step".

As described above, according to the processing management system 10 of the embodiment described above, in addition to the effects of the first embodiment, it is possible to attain the following effects.

(7) When the multi-function printer 20 receives the server information from the first management server 40A, the multi-function printer 20 acquires the first apparatus side account X(1) specified from the received server information, and reads out the apparatus side permission processing correlating to the first apparatus side account X(1). Further, the first management server 40A reads out the server side permission processing correlating to the server side account specified from the user information received from the multi-function printer 20. Further, based on the read-out apparatus side permission processing and server side permission processing, it is possible for the multi-function printer 20 to permit execution of the processing of which a usage is permitted by both of the first management server 40A and the multi-function printer 20.

When the server information is received from the second management server 40B by the multi-function printer 20, the multi-function printer 20 acquires the second apparatus side account X(2) specified from the received server information, and reads out the apparatus side permission processing correlating to the second apparatus side account X(2). Further, the second management server 40B reads out the server side permission processing correlating to the server side account specified from the user information received from the multi-function printer 20. Further, based on the read-out apparatus side permission processing and server side permission processing, it is possible for the multi-function printer 20 to permit execution of the processing of which a usage is permitted by both of the second management server 40B and the multi-function printer 20.

Further, when the server information is received from the third management server 40C by the multi-function printer 20, the multi-function printer 20 acquires the third apparatus side account X(3) specified from the received server information, and reads out the apparatus side permission processing correlating to the third apparatus side account X(3). Further, the third management server 40C reads out the server side permission processing correlating to the server side account specified from the user information received from the multi-function printer 20. Further, based on the read-out apparatus side permission processing and server side permission processing, it is possible for the multi-function printer 20 to permit execution of the processing of which a usage is permitted by both of the third management server 40C and the multi-function printer 20.

Further, the embodiments described above may be modified as follows.

In each embodiment, the multi-function printer 20 is provided with the grasp section that grasps the processing of which a usage is permitted by both of the multi-function printer 20 and the management server 40 and 40A to 40C. However, the management server may be provided with the grasp section. In this case, when the apparatus side reading section 35 reads out the apparatus side permission processing in the multi-function printer 20, the apparatus side communication section 32 transmits, to the management server, information relating to the apparatus side permission processing. If this occurs, the grasp section provided in the management server compares the received apparatus side permission processing with the server side permission processing section which is read out by the server side reading section 46, and thereby grasps the processing of which a usage is permitted by both of the multi-function printer 20 and the management server. If this occurs, the processing of which a usage is permitted by both of the multi-function printer 20 and the management server is transmitted to the screen preparing application 47, and thus the screen preparing application 47 prepares the processing selection screen B1 (see FIG. 7). Further, the server side communication section 41 transmits, to the multi-function printer 20, the screen information relating to the processing selection screen B1. According to this, in the multi-function printer 20, it is possible for the UI control section 31 to cause the processing selection screen B1 to be displayed on the display screen 232. In other words, the UI control section 31 having such a configuration may be also used to configure an example of "an execution permission section".

In the second embodiment, if the processing management system 10A is configured to include a plurality of management servers, the number of the management servers for configuring the processing management system 10A may be any one (for example, two or four) other than three.

In the second embodiment, the processing selection screen B1 is prepared in the management server which transmits the server information to the multi-function printer 20. However, the embodiment is not limited thereto, but the processing selection screen B1 may be prepared in the first management server 40A which is a master server. For example, the control device 24 of the multi-function printer 20 transmits, to the first management server 40A, information relating to the processing available for the user, and thus, it is possible for the first management server 40A to prepare the processing selection screen B1.

In the second embodiment, in a case where various information such as server information is transmitted from a sub-server to the multi-function printer 20, the information is not directly transmitted from the sub-server to the multi-function printer 20, but the information may be transmitted from the sub-server to multi-function printer 20 through the master server (the first management server 40A). Similarly, also in a case where an information piece or a request is transmitted from the multi-function printer 20 to a sub-server, the information or the request is not directly transmitted from the multi-function printer 20 to the sub-server, but the information or the request may be transmitted from the multi-function printer 20 to the sub-server through the master server (the first management server 40A).

In a case where it is difficult for the multi-function printer 20 and the management server to communicate with each other, and a N-TH apparatus side account X(N) corresponding to a uncommunicative apparatus side account is used to attain a login to the multi-function printer 20, usage information may not be stored in the multi-function printer 20. In this case, it is difficult for the management server to acquire the usage information from the multi-function printer 20 identical to the multi-function printer 20 which is logged in the multi-function printer 20 with the N-TH apparatus side account X(N).

The multi-function printer 20 may not acquire the usage information. In this case, of course, it is difficult for the management server to manage the usage information.

The uncommunicative apparatus side account may not be prepared. In this case, in a case where it is difficult for the multi-function printer 20 and the management server to communicate with each other, it is difficult for a user to use the multi-function printer 20.

If the apparatus side permission processing correlating to the communicative apparatus side account include the reception unrequired processing, the PC printing which is the reception required processing may not be included in the apparatus side permission processing.

If the apparatus side permission processing correlating to the communicative apparatus side account include the PC printing which is an example of the reception required processing, the memory printing, the copying, the scanning and the FAX which are the reception unrequired processing may not be included in the apparatus side permission processing.

In a case where it is difficult for the multi-function printer 20 and the management server to communicate with each other in a state where a communicative apparatus side account is used to attain a login to the multi-function printer 20, a logoff is performed, and thereafter, a N-TH apparatus side account X(N) which is the uncommunicative apparatus side account may be used to automatically cause a login to be performed to the multi-function printer 20. In this case, the screen displayed on the display screen 232 is automatically switched from the processing selection screen B1 to the processing selection screen N3 accordingly.

The processing selection screen B1 may not display unselective processing (for example, the "FAX" in FIG. 7).

The processing selection screen N3 may not display unselective processing (for example, the "memory printing" in FIG. 10).

The multi-function printer 20 provided in the processing management systems 10 and 10A may be one in number.

All of the screens displayed on the display screen 232 of the user interface 23 may be caused to be prepared by the control device 24 of the multi-function printer 20.

The electronic apparatuses constituting the processing management system may be other machines other than the multi-function printer. For example, the electronic apparatus may be a printer than can executes only the PC printing and the memory printing, or a copy machine that can execute only the copying.

In each embodiment, an authentication card is moved to face the reception section 233 of the user interface 23 and the user information is read out from the authentication card to the multi-function printer 20. However, the embodiments are not limited thereto, but any other technique may be used to cause user information to be input to the multi-function printer 20. For example, an operating section 231 of the user interface 23 may be used to cause a user to directly input a pass word.

The entire disclosure of Japanese Patent Application No. 2014-175430, filed Aug. 29, 2014 is expressly incorporated by reference herein.

What is claimed is:

1. A processing management system comprising:
an electronic apparatus; and
a management server that communicates with the electronic apparatus through a network,
wherein the management server includes
a server side account acquiring section that, when user information corresponding to information relating to a user who logs in to the electronic apparatus is received from the electronic apparatus, acquires a server side account corresponding to an account specified from the user information;
a server side management section that correlates the server side account with server side permission processing corresponding to processing permitted to be used in the electronic apparatus, and manages the server side account and the server side permission processing which correlate to each other;
a server side reading section that reads out, from the server side management section, the server side permission processing correlating to the server side account acquired by the server side account acquiring section, and
wherein the electronic apparatus includes
an apparatus side communication section that, when the user information is input in order to log in to the electronic apparatus, transmits the user information to the management server;
an apparatus side account acquiring section that, based on the input of the user information, acquires an apparatus side account corresponding to an account through which the electronic apparatus can be used;
an apparatus side management section that correlates an apparatus side account with an apparatus side permission processing permitted to be used in the electronic apparatus, and manages the apparatus side account and the apparatus side permission processing which correlate to each other;
an apparatus side reading section that reads out, from the apparatus side management section, the apparatus side permission processing correlating to the apparatus side account acquired by the apparatus side account acquiring section;
an execution permission section that permits execution of the processing of which a usage is permitted by both of the management server and the electronic apparatus; and
a control section that, when execution of the processing permitted by the execution permission section is requested, causes the processing to be executed.

2. The processing management system according to claim 1,
wherein the management server includes a server side communication section that transmits, to the electronic apparatus, server information corresponding to information relating to the management server, when the user information is received from the electronic apparatus, and
wherein when the server information is received from the management server, the apparatus side account acquiring section of the electronic apparatus acquires an account specified from the server information, the specified account being the apparatus side account.

3. The processing management system according to claim 2,
wherein when the control section causes the processing to be executed, the apparatus side communication section of the electronic apparatus transmits, to the management server, usage information corresponding to information relating to the execution of the processing, and
wherein the management server includes a server side usage information storing section that stores the usage information received from the electronic apparatus.

4. The processing management system according to claim 3,
wherein the apparatus side account which the electronic apparatus manages includes a communicative apparatus side account which causes the management server to have access to the electronic apparatus, and a uncommunicative apparatus side account which causes the access of the management server to the electronic apparatus to not be required,
wherein when the server information is received from the management server, the apparatus side account acquiring section of the electronic apparatus acquires an account specified from the received server information, the specified account being the communicative apparatus side account, whereas when the user information is input in order to log in to the electronic apparatus in a state where it is difficult for the electronic apparatus and the management server to communicate with each other, the apparatus side account acquiring section of the electronic apparatus acquires the uncommunicative apparatus side account,
wherein when the account acquired by the apparatus side account acquiring section is the communicative apparatus side account, the apparatus side reading section of the electronic apparatus reads out, from the apparatus side management section, the apparatus side permission processing correlating to the communicative apparatus side account, whereas when the account acquired by the apparatus side account acquiring section is the uncommunicative apparatus side account, the apparatus side reading section of the electronic apparatus reads out, from the apparatus side management section, the apparatus side permission processing correlating to the uncommunicative apparatus side account, and
wherein when the account acquired by the apparatus side account acquiring section is the communicative apparatus side account, the execution permission section of the electronic apparatus permits execution of the processing of which a usage is permitted by both of the management server and the electronic apparatus, whereas when the account acquired by the apparatus side account acquiring section is the uncommunicative apparatus side account, the execution permission section of the electronic apparatus permits execution of the processing of which a usage is permitted by the electronic apparatus.

5. The processing management system according to claim 4,
wherein the electronic apparatus includes an apparatus side usage information storing section which stores usage information corresponding to information relating to execution of processing when the control section causes the processing to be executed in a state where the account acquired by the apparatus side account acquiring section is the uncommunicative apparatus side account, and
wherein when it is possible for the electronic apparatus and the management server to communicate with each other, the apparatus side communication section of the electronic apparatus transmits, to the management server, the usage information stored in the apparatus side usage information storing section.

6. The processing management system according to claim 4,
wherein when it is difficult for the electronic apparatus and the management server to communicate with each other in a state where the account acquired by the apparatus side account acquiring section is the communicative apparatus side account, the execution permission section of the electronic apparatus comes into a logoff state to become in a state of being capable of receiving login to the electronic apparatus.

7. The processing management system according to claim 4,
wherein the electronic apparatus is a machine capable of executing reception required processing corresponding to processing based on information received from the management server, and reception unrequired processing corresponding processing in which reception information from the management server is not required, and
wherein processing relating to the uncommunicative apparatus side account is the reception unrequired processing, and processing relating to the communicative apparatus side account includes at least one of the reception required processing and the reception unrequired processing.

8. The processing management system according to claim 2,
wherein the electronic apparatus is capable of communicating with a plurality of the management servers through the network,
wherein a first apparatus side account correlating to a first management server among each management server, and a second apparatus side account correlating to a second management server among each management server are prepared to be the apparatus side account,
wherein when the apparatus side account specified from the server information is the first apparatus side account, the apparatus side reading section of the electronic apparatus reads out, from the apparatus side management section, the apparatus side permission processing correlating to the first apparatus side account, whereas when the apparatus side account specified from the server information is the second apparatus side account, the apparatus side reading section of the electronic apparatus reads out, from the apparatus side management section, the apparatus side permission processing correlating to the second apparatus side account, and
wherein when the apparatus side account specified from the server information is the first apparatus side account, the execution permission section of the electronic apparatus permits execution of the processing of which a usage is permitted by both of the first management server and the electronic apparatus, whereas when the apparatus side account specified from the server information is the second apparatus side account, the execution permission section of the electronic apparatus permits execution of the processing of which a usage is permitted by both of the second management server and the electronic apparatus.

9. The processing management system according to claim 1,
wherein the electronic apparatus includes a grasp section that compares the apparatus side permission processing read out by the apparatus side reading section with the server side permission processing read out by the server side reading section of the management server, and thereby grasps the processing of which a usage is permitted by both of the electronic apparatus and the management server, and wherein the execution permission section of the electronic apparatus permits execution of the processing of which the usage is permitted by both of the electronic apparatus and the management server, the grasp section grasping that the usage of the processing is permitted by both of the electronic apparatus and the management server.

10. The processing management system according to claim 1, wherein the management server further includes a grasp section that compares the server side permission processing read out by the server side reading section with the apparatus side permission processing read out by the apparatus side reading section of the electronic apparatus, and thereby grasps the processing of which a usage is permitted by both of the electronic apparatus and the management server;

a server side communication section that transmits, to the electronic apparatus, grasped permission information corresponding to information relating to a result of grasping performed by the grasp section; and wherein when the grasped permission information is received from the management server, the execution permission section of the electronic apparatus permits execution of the processing of which the usage is permitted by both of the electronic apparatus and the management server, the grasp section grasping that the usage of the processing is permitted by both of the electronic apparatus and the management server.

11. An electronic apparatus that communicates with a management server through a network, the electronic apparatus comprising:

an apparatus side communication section that, when user information corresponding to information relating to a user who logs in to the electronic apparatus is input, transmits the user information to the management server;

an apparatus side account acquiring section that, based on the input of the user information, acquires an apparatus side account corresponding to an account through which the electronic apparatus can be used;

an apparatus side management section that correlates an apparatus side account with an apparatus side permission processing permitted to be used in the electronic apparatus, and manages the apparatus side account and the apparatus side permission processing which correlate to each other;

an apparatus side reading section that reads out, from the apparatus side management section, the apparatus side permission processing correlating to the apparatus side account acquired by the apparatus side account acquiring section;

an execution permission section that, when information relating to server side permission processing corresponding to processing of which a usage is permitted by the electronic apparatus is received from the management server that transmits the user information, permits execution of the processing of which a usage is permitted by both of the management server and the electronic apparatus; and a control section that, when execution of the processing permitted by the execution permission section is requested, causes the processing to be executed.

12. A management server that communicates with an electronic apparatus through a network, wherein when user information corresponding to information relating to a user who logs in to the electronic apparatus is input, the electronic apparatus acquires an apparatus side account based on the input of the user information, and transmits, to the management server, information relating to apparatus side permission processing corresponding to processing correlating to the acquired apparatus side account, and wherein the management server comprises:

a server side account acquiring section that, when the user information is received from the electronic apparatus, acquires a server side account corresponding to an account specified from the user information;

a server side management section that correlates the server side account with server side permission processing permitted to be used in the electronic apparatus, and manages the server side account and the server side permission processing which correlate to each other;

a server side reading section that reads out, from the server side management section, the server side permission processing correlating to the server side account acquired by the server side account acquiring section;

a grasp section that, based on the server side permission processing read out by the server side reading section and information relating to the apparatus side permission processing received from the electronic apparatus, grasps the processing of which a usage is permitted by both of the electronic apparatus and the management server; and a server side communication section that transmits, to the electronic apparatus, grasped permission information corresponding to information relating to a result of grasping performed by the grasp section.

* * * * *